United States Patent
Kono et al.

[19]

[11] Patent Number: 5,878,274
[45] Date of Patent: Mar. 2, 1999

[54] INTELLIGENT MULTI MODAL COMMUNICATIONS APPARATUS UTILIZING PREDETERMINED RULES TO CHOOSE OPTIMAL COMBINATIONS OF INPUT AND OUTPUT FORMATS

[75] Inventors: Yasuyuki Kono; Tomoo Ikeda; Tetsuro Chino, all of Osaka, Japan; Katsumi Tanaka, Menlo Park, Calif.

[73] Assignee: Kabushiki Kaisha Toshiba, Kawasaki, Japan

[21] Appl. No.: 683,264

[22] Filed: Jul. 18, 1996

[30] Foreign Application Priority Data

Jul. 19, 1995 [JP] Japan .................................. 7-205202
Mar. 14, 1996 [JP] Japan .................................. 8-056613

[51] Int. Cl.$^6$ .................................................. G06F 13/14
[52] U.S. Cl. .......................... 395/828; 340/825; 340/500; 395/651; 711/170
[58] Field of Search .................................. 345/336, 337, 345/338; 364/140, 141, 148, 149, 150, 151, 188, 191, 194; 705/1, 26; 395/821, 828, 651; 711/170; 340/825, 500

[56] References Cited

U.S. PATENT DOCUMENTS

| | | | |
|---|---|---|---|
| 5,201,034 | 4/1993 | Matsuura et al. ...................... | 395/155 |
| 5,490,089 | 2/1996 | Smith et al. ............................. | 364/514 |
| 5,600,765 | 2/1997 | Ando et al. .............................. | 395/133 |

OTHER PUBLICATIONS

"Artifical Intelligence Multimedia Presentation Processing," IBM TDB, No. 10, pp. 406–407, Mar. 1992.

"The Application of Natural Language Models to Intelligent Multimedia," J. Burger et al. In Intelligent Multimedia Interfaces, M. Maybury (Ed.), AAAI Press (1993) pp. 174–196.

"The Design of Illustrated Documents as a Planning Task," E. Andre et al. In Intelligence Multimedia Interfaces, M. Maybury (Ed.), AAAI Press (1993) pp. 94–116.

*Primary Examiner*—Thomas C. Lee
*Assistant Examiner*—Douglas Rupert
*Attorney, Agent, or Firm*—Oblon, Spivak, McClelland, Maier & Neustadt, P.C.

[57] ABSTRACT

A multimodal interaction apparatus for performing a predetermined process depending upon interaction with a user to output a result of the process. The multimodal interaction apparatus comprises an input section for interpreting information input from at least one input means selected from plural input means in accordance with input media allocation and generating correspondence information in accordance with the interpretation, a problem solving section for subjecting the correspondence information to a predetermined process and outputting a result of the process and an output section for outputting the result of the process from at least one output means selected from plural output means in accordance with output media allocation.

17 Claims, 12 Drawing Sheets

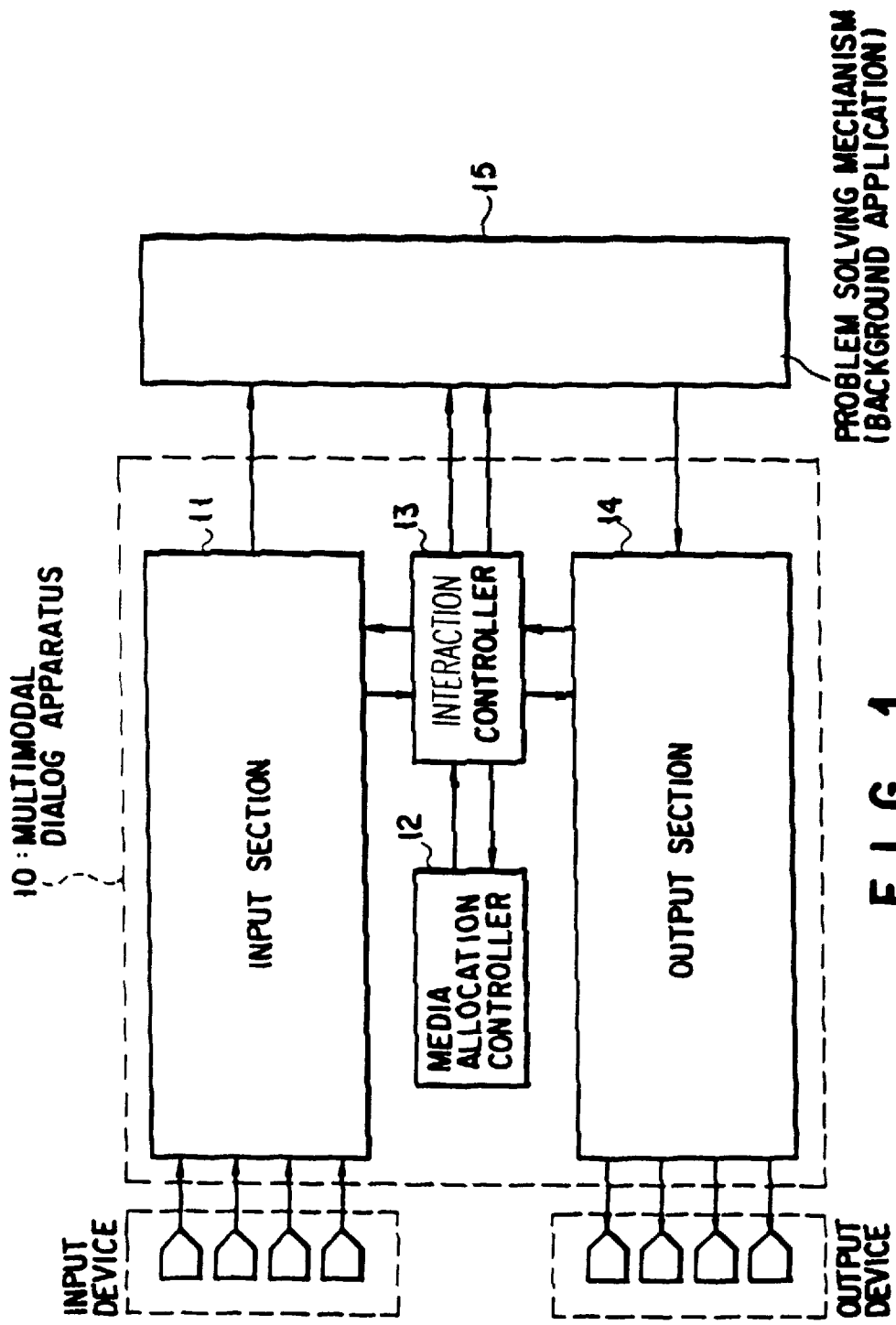
F I G. 1

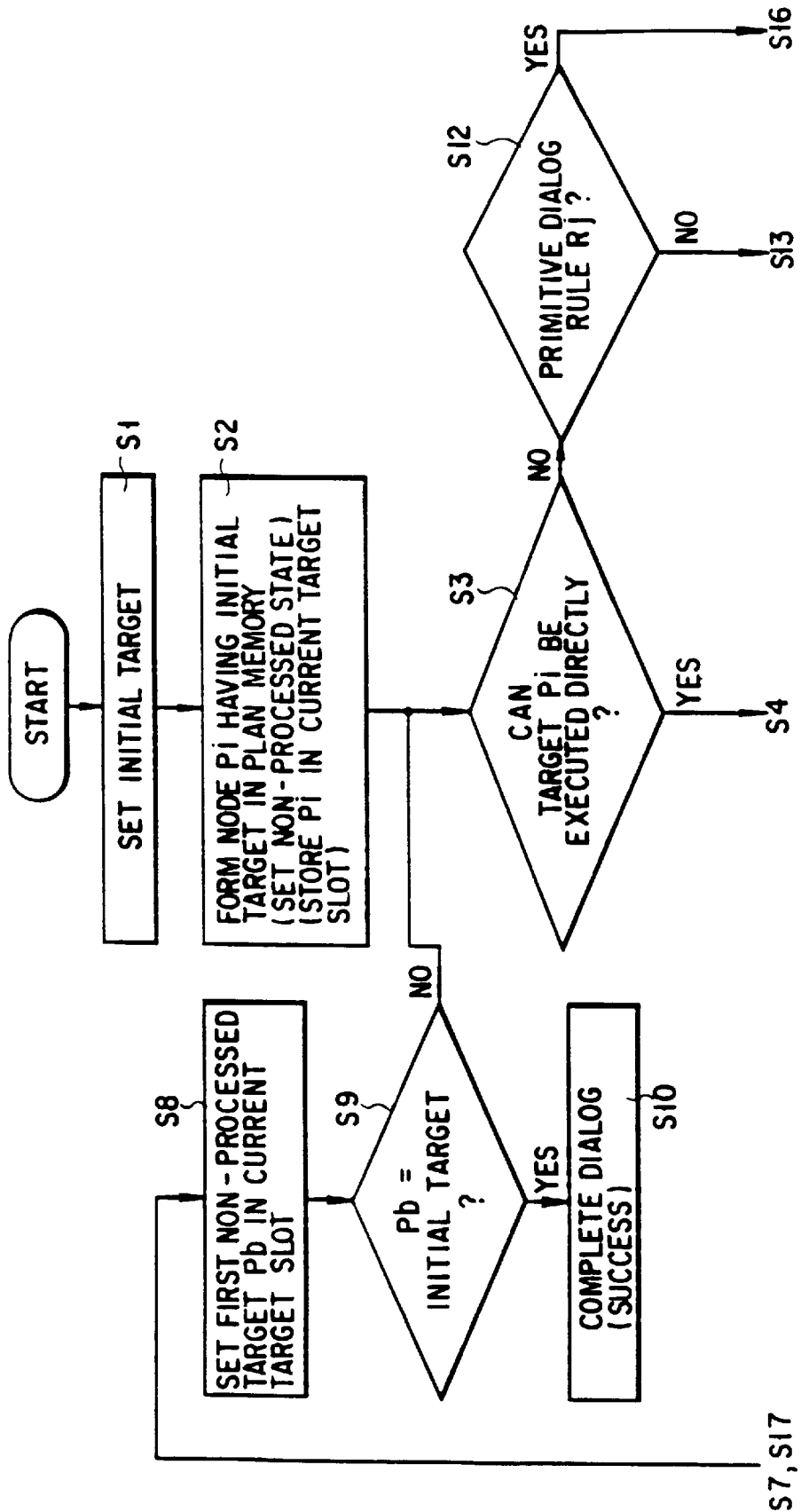
F I G. 5

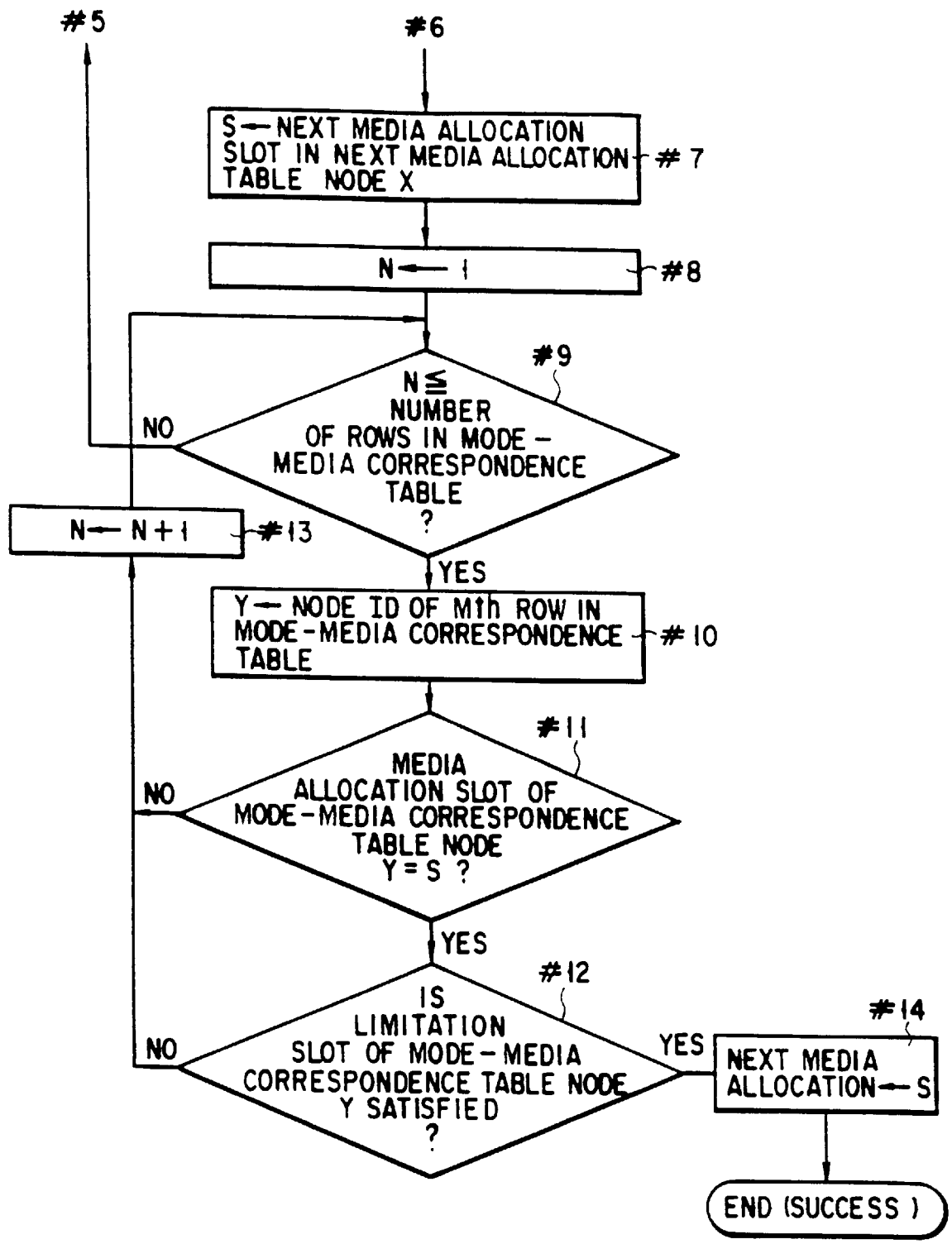
F I G. 9 is 5,878,274

INTELLIGENT MULTI MODAL COMMUNICATIONS APPARATUS UTILIZING PREDETERMINED RULES TO CHOOSE OPTIMAL COMBINATIONS OF INPUT AND OUTPUT FORMATS

BACKGROUND OF THE INVENTION

1. Field of the Invention

The present invention relates to a human-machine interaction apparatus adaptable to a data processing apparatus and having a plurality of input devices and output devices that can be combined with one another for use.

2. Description of the Related Art

In recent years, computers have been provided with a plurality of different type input devices, such as a keyboard, a mouse, a microphone, a touch panel, an image scanner, a video camera, a pen, a data glove and a human detection sensor to enable various information items to be input in various forms. Also an output device, such as a display unit and a speaker unit, has been provided with functions capable of outputting various information items in a variety of forms, such as spoken language, effect sound and music. Thus, there arises a requirement for realizing a human-machine interface which can easily be operated by effectively using the variety of the input and output devices.

In recent years, a multimodal interface has been researched and developed energetically. The interface includes an input means and a plurality of output devices. The input means is formed by combining a plurality of input devices and is capable of performing a complicated input, that is, input media using the foregoing input. The output device is capable of, for example, issuing a voice command from a user while pointing a subject on a display with the finger of the user, that is, output media. Moreover, an output means which uses a plurality of output devices, such as a display unit and a speaker unit, and which is capable of performing a complicated output formed by combining a plurality of output devices, the contents and forms of the outputs from the same such that, for example, a nuance is communicated with the expression of the face of a human being displayed on a display unit and effect sound from a speaker unit while announcing a message by a spoken language from the speaker unit, that is, output media is provided. Thus, the interface has been intended to be easily operated and the quality and efficiency in information transmission have been required to be improved.

Hitherto, in order to realize smooth and natural communication of information between a user and an application software on a computer, the communication of the information has been considered as interaction between the user and the application software and interaction plan has been developed in accordance with a predetermined stored interaction rule so that multimodal interaction has been realized by means of a combination of input and output methods determined by the interaction rule.

However, a method in which a combination of devices for use in the input and output to be employed in each stage of the interaction and a method of use of the devices, that is, a method in which media allocation is previously described in the interaction rule, sometimes encounters a problem. In a case where voice is determined as the input and output forms, use of voice as input and output means is unsuitable if the circumferential noise level is too high. However, the method cannot solve the foregoing problem. That is, there arises a problem in that an appropriate combination of input and output means suitable to the situation cannot be selected to perform interaction with a user because the media allocation is arranged fixedly regardless of the flow of the interaction.

A case will now be considered in which interaction apparatus permitting a user to perform voice input is operated. Since the level of the voice recognition technique has been unsatisfactory at present, a case will occur in which recognition fails even if a certain user repeatedly gives the same word depending upon the characteristic of the user. The foregoing case frequently takes place if the pronunciation of the user have excessive accents. Thus, the possibility for the interaction apparatus to succeed in recognition is lowered excessively.

Since the conventional multimodal interaction apparatus, however, repeatedly requires a user of the foregoing type to again perform the voice input, there arises a problem in that time is wasted and the user feels stress.

A tourist guide system employing voice instruction will now be considered with which recognition of a voice input of a place name is performed to retrieve a required tourist resort from a database and to output a result of the retrieval to an output means. In a case where the tourist guide system in Scotland has requested a user to voice-input a place name and the American tourist does not know the dialect pronunciation "láx ness or lók ness" of Loch Ness famous for Nessie thus pronounces "lák ness or lók ness", and thus the system has failed in the retrieval, the conventional multimodal interaction apparatus having no means, which is capable of dynamically performing input and output media allocation, encounters a difficulty in restoring the communication with the user.

That is, the fact that the user does not know the correct reading of the Loch Ness as "láx ness or lók ness" causes the failure to occur in the communication with the user. Although the communication will probably be restored if the mode of the system is switched to, for example, a character input selection mode, the input and output media allocation cannot be changed to be adaptable to the situation and thus the system is brought to a stiff state. As a result, the guidance service cannot be provided.

In a case where the conventional interaction apparatus makes a presentation of the contents of a result of retrieval of the database to a user, the output form is fixed as programmed previously. That is, one fixed output form is employed regardless of the number of outputs of the results of the retrieval. Thus, the input and output methods are sometimes difficult to be understood and operated for a user such that tens to hundreds of results of retrieval are one by one read by means of voice or only several results of retrieval are displayed in the form of a table.

Since the system cannot conduct interaction with a user by the allocated media required by the user, there arises a problem in that the user is required to perform input and output by the media allocated and instructed by the system.

Although a variety of input means are available, a common input means which can easily be operated for all users does not exist. For example, a certain user likes voice input, while another user likes input of a command character string by using a keyboard.

As described above, the optimum input and output means are different among users. However, the conventional interaction apparatus has not been structured to be adaptable to the difference existing among the persons. Thus, a fixed combination of input and output means is provided and the user cannot use required input and output means. Therefore, the conventional interaction apparatus cannot easily be operated.

With the conventional multimodal interaction apparatus having a plurality of input means, the input means to be employed and the input means which can be employed at a certain point of time cannot easily be recognized by a user. Thus, there arises a problem in that the user feels a stress or the user is perplexed when the user intends to perform the input.

In a case where voice cannot preferably be used with a conventional interaction apparatus which is capable of performing voice input and output due to intense external noise or the like, the conventional interaction apparatus, which cannot perform dynamic media allocation, encounters a problem in that the input and output methods cannot be changed so as to be adaptable to change in the environmental factors.

As described above, with the conventional multimodal interaction apparatus, a user is forced to conduct interaction with the system in accordance with the combination of the input and output modes determined previously in accordance with the interaction rule set to the system. Thus, the interface of the conventional interaction apparatus has been difficult for a user to understand and operate, thus resulting in the user feeling a stress when the user inputs information. Moreover, the user cannot easily understand the output from the apparatus. Thus, the interface sometimes causes a failure in input and output to take place. Even if a failure takes place in input and output due to the characteristic of a selected specific input and output means such that a failure of input or erroneous input is probable to occur due to a failure in recognition with the voice word recognition mode, the purpose of the interaction cannot be completed.

SUMMARY OF THE INVENTION

In view of the foregoing, an object of the present invention is to provide a multimodal interaction apparatus capable of serving as an input and output interface which can easily be used by a user.

In particular, an object of the present invention is to provide a multimodal interaction apparatus having a function for dynamically selecting appropriate input and output media allocation at a certain point of time so as to be capable of providing an input and output interface which serves as a front end of an application program and which can easily be used for a user so as to be adaptable to a variety of situations.

According to the present invention, a multimodal interaction apparatus comprises: means for, in accordance with a predetermined rule, dynamically generating a method for selecting and interpreting required input data in order to constitute input data to be supplied to an application program from input data supplied from a user to a plurality of input devices and a method of combining the foregoing data items; and means for, in accordance with a predetermined rule, dynamically generating a method of selecting output data in order to generate an expression to be presented to a user from output data from an application program and a method of combining and expressing the data items, so that an appropriate combination of input and output means are dynamically selected at each point of time during interaction with the user to enable the interaction to be continued.

According to the present invention, when a user holds interaction with a computer system, input and output methods, on which input and output means which can be used at each point of time during the interaction are reflected, can be selected.

Moreover, the user is permitted to select and operate input and output methods which use input and output means which can easily be used by the user.

According to the present invention, a problem experienced with the conventional multimodal interaction apparatus in that the media allocation is fixed with respect to the flow of the interaction and thus a combination of input and output means cannot be selected to be adaptable to a situation to hold interaction with the user can be solved.

According to the present invention, a problem experienced with the conventional multimodal interaction apparatus in that requests are frequently made to a specific user to again perform voice input causing waste of time to occur and causing a user to feel stress can be solved by the structure of the present invention comprising a means for dynamically selecting and switching input and output means. Thus, the user is enabled to use the computer system without waste of time and stress felt by the user.

According to the present invention, a problem experienced with the conventional multimodal interaction apparatus that the communication with a user cannot easily be restored if a process of interpreting the input fails can be solved by the structure of the present invention comprising the means for dynamically selecting and switching input and output means. Thus, the communication with the user can quickly be restored.

In a case where the conventional interaction apparatus makes a presentation of the contents of a result of retrieval of a database to a user, a fixed output method has been employed such that a voice reading of outputs of results of retrieval is performed even if presentation of tens to hundreds of results of the retrieval is performed when the voice output method has been employed to be adaptable to notify small number of results of retrieval. Thus, the same output method has been employed regardless of the number of outputs.

In a contrary case where a table method is employed to easily treat a large quantity of results of retrieval, only a small number of results of retrieval is always displayed in the form of a table. However, the present invention has the structure such that a means for dynamically selecting and switching input and output means is provided so that the input and output means are enabled to be dynamically selected and switched if the input and output methods cannot easily be understood and operated so that the foregoing problem is solved. Thus, input and output methods which can easily be understood by the user can be employed.

According to the present invention, a problem experienced with the conventional interaction apparatus in that the personal difference about input and output means, which can easily be used by each user, has not been considered and a fixed combination of input and output means has been selected can be solved because a combination of input and output methods, which can easily be used by each user, can be used.

According to the present invention, a problem experienced with a conventional multimodal interaction apparatus having a plurality of input means in that a user cannot easily recognize input means to be employed and input means, which can be used at a certain point of time, can be solved by the structure of the present invention which comprises a displaying or indicating means which can be used by a user to input information. Thus, the user is enabled to easily recognize the input means so that an interface, which can easily be understood by the user, is provided.

As a result, a user is permitted to use a human-machine interface which depends upon the quality and quantity of information required by the user, the application program and input and output means which can be used by the computer system but which does not depend upon the application program.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing the schematic structure of a multimodal interaction apparatus according to the present invention;

FIGS. 5, 6, and 7 show a flow chart showing interaction control algorithm;

FIGS. 8 and 9 show a flow chart of the operation of a media allocation controller;

DETAILED DESCRIPTION OF THE PREFERRED EMBODIMENTS

Figure 2:
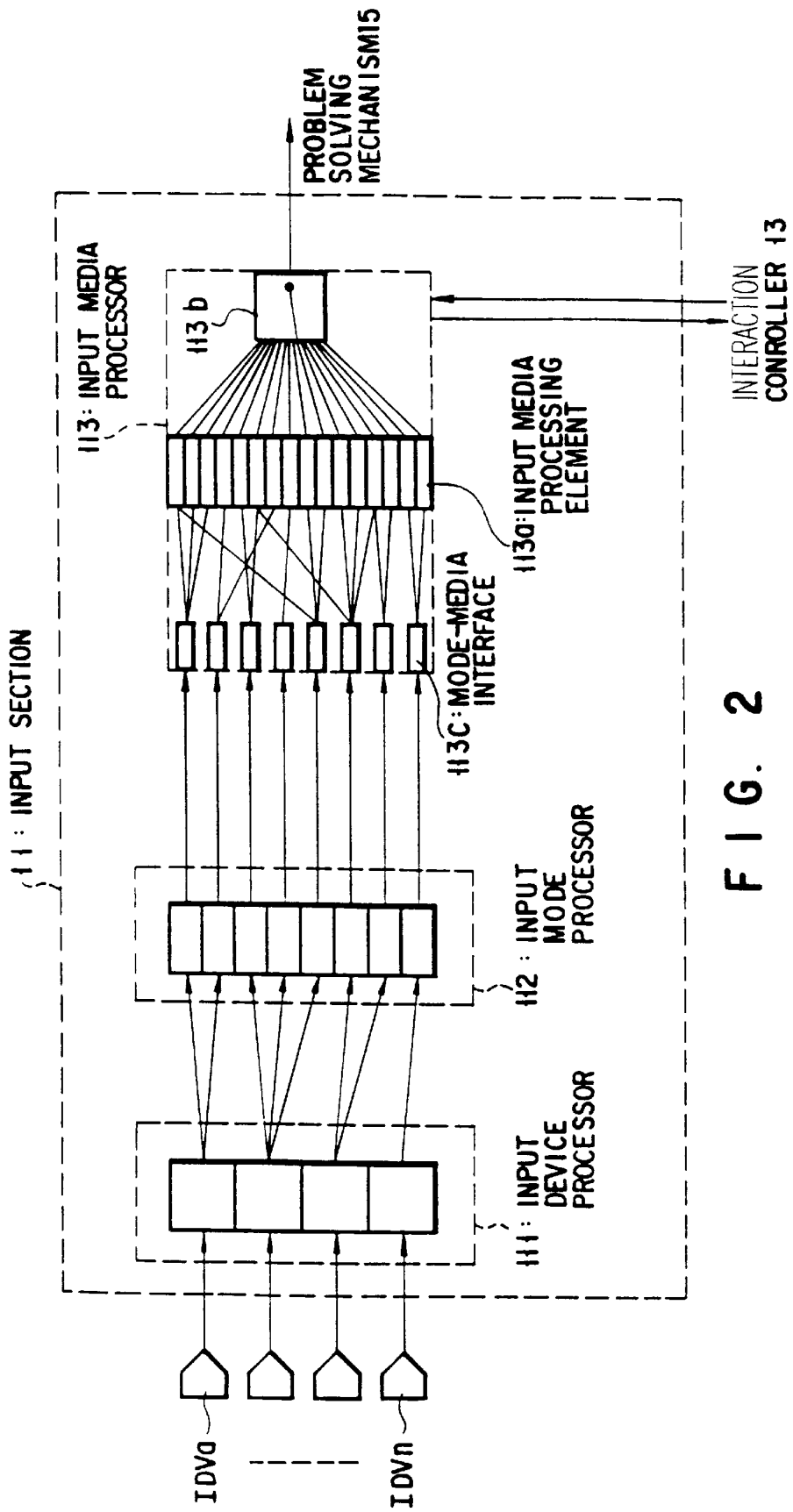
FIG. 2 is a block diagram showing the detailed structure of the input section shown in FIG. 1.

A preferred embodiment of a multimodal interaction apparatus according to the present invention will now be described with reference to the accompanying drawings. The multimodal interaction apparatus according to the present invention has means for respectively dynamically selecting combination of input and output devices or modes. As a result, a suitable input and output method corresponding to the current state of the apparatus can be provided, and an interface, which can easily be operated, can be realized. Moreover, the apparatus has a means for indicating, to a user, input means which can be used at present. As a result, an input environment, which can easily be understood, can be provided for a user. Moreover, the combination of the input means and the output means can be changed to recover a failure in interaction with a user to enable the interaction to be continued.

FIG. 1 is a schematic view of the embodiment of the multimodal interaction apparatus according to the present invention. The multimodal interaction apparatus 10 comprises four components; an input section 11 to be connected to an input device, an output section 14 to be connected to an output device, a media allocation controller 12, and interaction controller 13 to be connected to the input section 11. Thus, the multimodal interaction apparatus 10 performs a process of interaction with a user through physical apparatuses, such as the input and output devices connected to the system and interfaces between the user and a problem solving mechanism (a background application) 15.

The input section 11 fetches outputs from various input devices IDVa to IDVn, such as a mouse unit, a microphone, a TV camera, a keyboard, a tablet, an image scanner, a sensor and the like. The output section 14 generates outputs for operating a variety of output devices ODVa to ODVn, such as a display unit, a speaker unit, lamps, a printer, a plotter and the like.

The media allocation controller 12 is an apparatus for determining the combination between the input and output media and the method of use of the various devices, that is, media allocation. The media allocation controller 12 has a function capable of selecting an optimum combination for the current situation.

The interaction controller 13 requires media allocation in accordance with information to be supplied or received between the interaction controller 13 and the problem solving mechanism 15 and status information supplied from the input section 11 and the output section 14. Moreover, the interaction controller 13 generates interaction plan. Thus, the interaction controller 13 controls the method and flow of interaction between a user and the system.

The problem solving mechanism 15 is an application for making an answer or a reply of an input, the problem solving mechanism 15 being an application for issuing a target answer through interaction or performing a target task. The problem solving mechanism 15 may be any application, for example, a tourist information system, a season ticket or train ticket issuing machine or the like.

Figure 3:
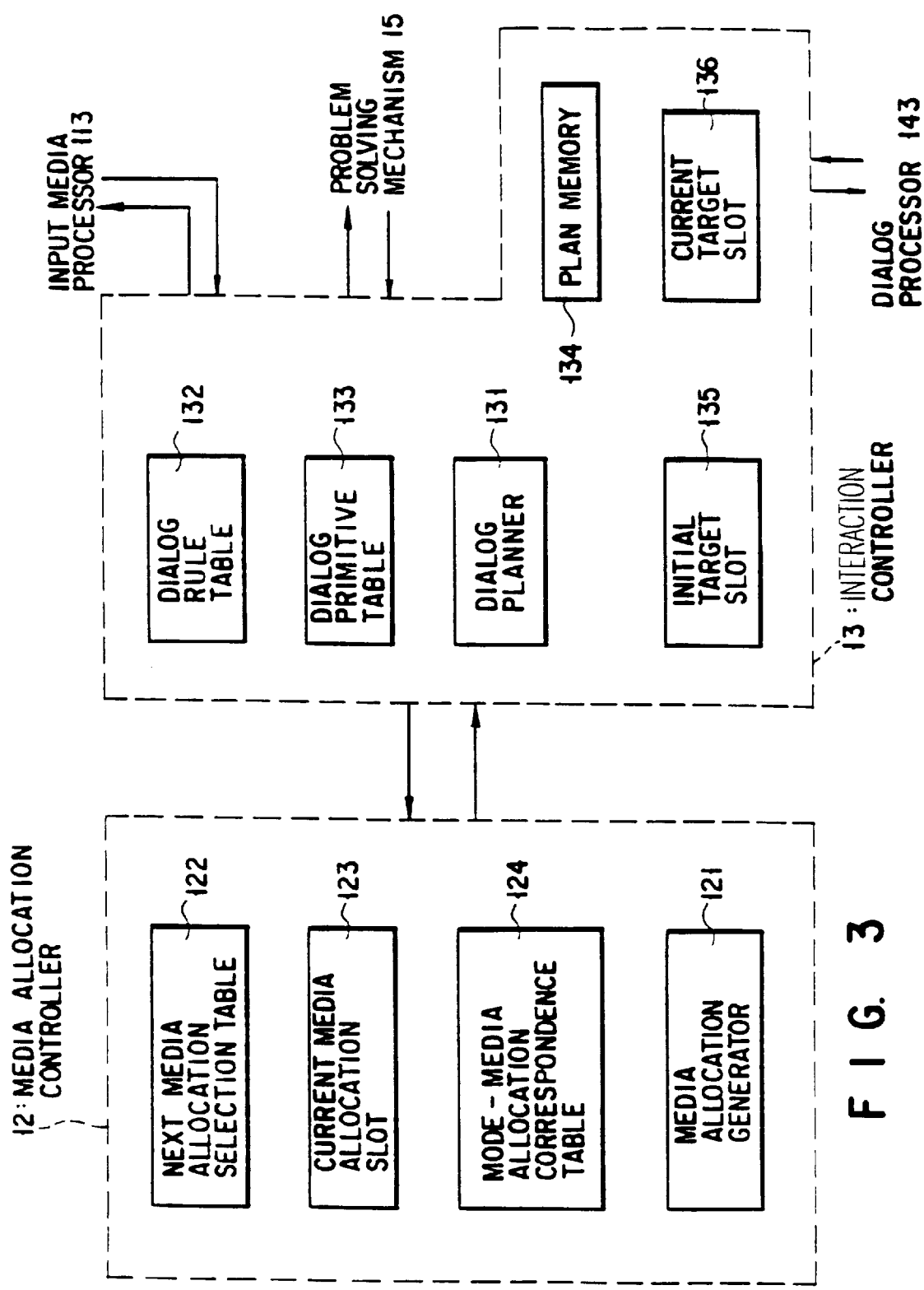
FIG. 3 is a block diagram showing the detailed structures of the media allocation controller and the interaction controller shown in FIG. 1.
Figure 4:
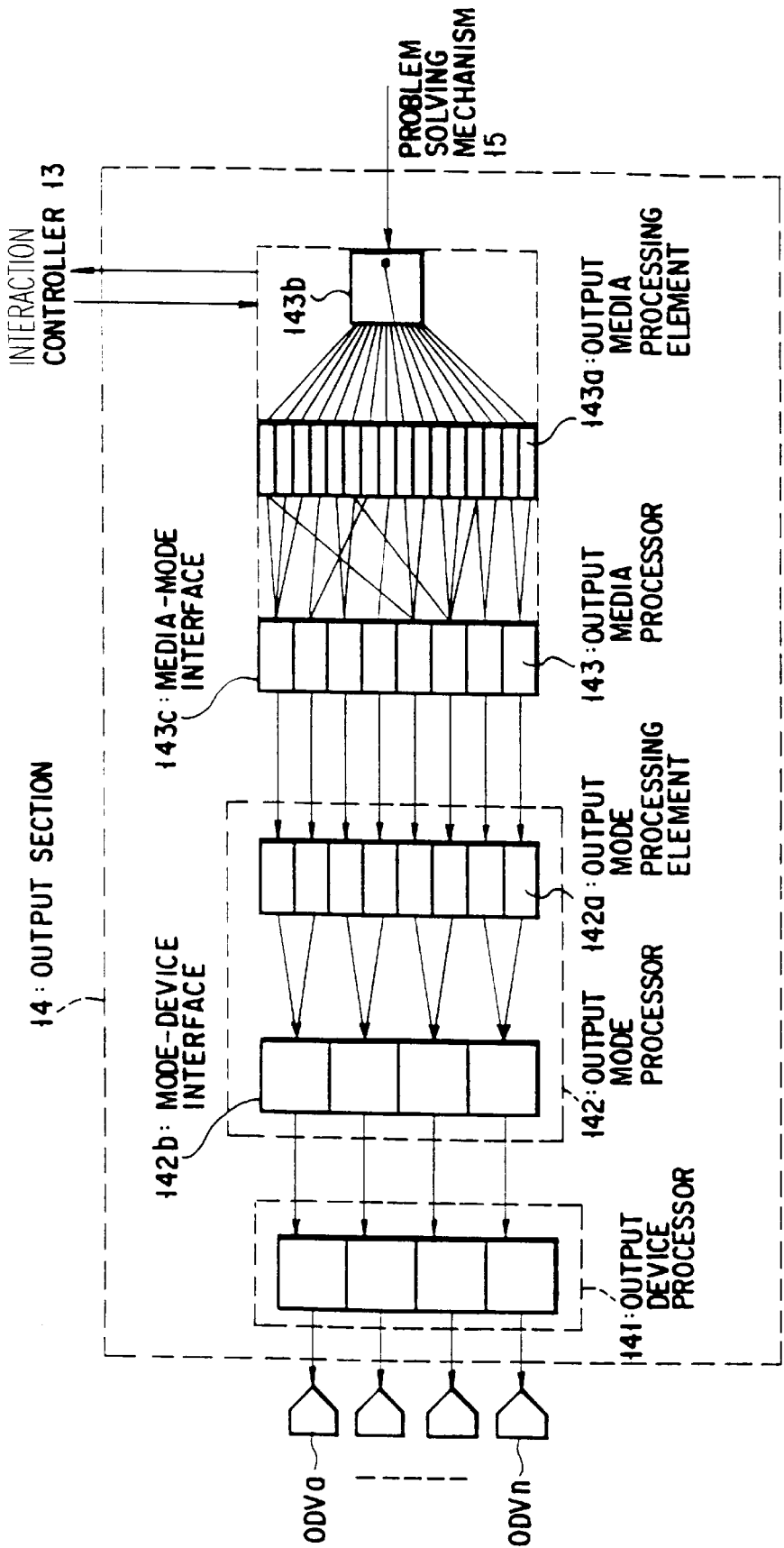
FIG. 4 is a block diagram showing the detailed structure of the output section shown in FIG. 1.

Referring to FIGS. 2 to 4, each of the units above will now be described. As shown in FIG. 2, the input section 11 comprises three modules; an input device processor 111, an input mode processor 112 and an input media processor 113. As shown in FIG. 4, the output section 14 comprises three modules; an output media processor 143, an output mode processor 142 and an output media processor 141.

The term "model" is a concept obtained by interpreting an input (or an output) from one device and by forming it into abstract. For example, data supplied from the mouse unit can be, by plural mode elements for interpreting the data, interpreted and used in a plurality of modes, such as an instruction of a subject to be operated and issue of a command.

Similarly, the term "media" is a concept formed by combining results of interpretation supplied from one mode or plural modes, the media being able to supply a result of a process, which can be obtained by combining inputs, to a subject to be instructed, the result of the processing being supplied as the contents of the instruction.

For example, a mouse-object instruction-voice command media interprets both an input from a mouse unit, which is a pointing device of a personal computer or the like, and a voice command so as to issue a command. The inputs of the media are results of interpretation of a voice command mode capable of interpreting voice for instructing a command to an application and a mouse object instruction mode for interpreting an input from the mouse unit as an operation for instructing a subject to be operated with the command to combine the inputs to, for example, notify a process that "a command instructed with voice is issued to a subject instructed with the mouse".

Referring back to FIG. 2, the input device processor 111, which is the component of the input section 11, receives data transmitted from each input device IDV and comprises input device processing elements as components thereof, each of the input device processing elements being arranged to perform a minimum process for interpreting data, such as conversion of data into digital data.

The device processing elements are provided to correspond to the input devices IDVs so as to be operated independently and in parallel. Each device processing element processes the inputs from the corresponding devices and then transmits the processed inputs to one or plural corresponding input mode processors 112. For example, a microphone processing element fetches, for example, voice supplied from a user through a microphone together with background noise to convert the voice into a digital audio signal having, for example, a sampling frequency of 12 kHz and a quantizing bit number of 16 bits. The microphone processing element transmits the digital audio signal to the input mode processor 112.

The input mode processor 112 comprises devices for processing inputs to each abstract input mode. One input mode processing element corresponds to one abstract input mode to abstract and interpret shaped data transmitted from one input device processing element for each abstract mode. Each input mode processing device corresponds to one or more input device processing elements as shown in TABLES 1 and 2.

TABLE 1

| INPUT DEVICE PROCESSING ELEMENT | INPUT MODE PROCESSING DEVICE |
|---|---|
| SENSOR DEVICE INPUT | SENSOR MODE INPUT DEVICE |
| MICROPHONE DEVICE INPUT | SPOKEN LANGUAGE MODE INPUT, AUDIO MODE INPUT, BACKGROUND NOISE MODE INPUT |
| KEYBOARD (KBD) DEVICE INPUT | KBD RAW EVENT MODE INPUT, KBD CHARACTER MODE INPUT, KBD COMMAND MODE INPUT |
| TOUCH PANEL DEVICE INPUT | TOUCH PANEL COMMAND INPUT |
| MOUSE DEVICE INPUT | MOUSE COMMAND MODE INPUT, MOUSE HAND-WRITTEN CHARACTER MODE INPUT, MOUSE DRAWING MODE INPUT |
| PEN DEVICE INPUT | PEN COMMAND MODE INPUT, PEN HAND-WRITTEN CHARACTER MODE INPUT, PEN DRAWING MODE INPUT, PEN RASTER MODE INPUT, PEN GESTURE COMMAND MODE INPUT |
| SCANNER DEVICE INPUT | SCANNER DRAWING MODE INPUT, SCANNER RASTER MODE INPUT |
| CARD DEVICE INPUT | CARD MAGNETIC INFORMATION MODE INPUT |

TABLE 2

| MODE INPUT ELEMENT NAME | INTERPRETATION |
|---|---|
| SENSOR MODE INPUT | CHANGE IN THE FRONT STATE OF THE SYSTEM |
| SPOKEN LANGUAGE MODE INPUT | SPEECH RECOGNITION RESULT |
| AUDIO MODE INPUT | NON-LANGUAGE SPEECH INFORMATION |
| BACKGROUND NOISE MODE INPUT | BACKGROUND NOISE INFORMATION |
| KBD RAW EVENT MODE INPUT | RAW KEY DEPRESSION SERIES (E.G., ROMAN CHARACTERS) |
| KBD CHARACTER MODE INPUT | CHARACTER STRING |
| KBD COMMAND INPUT | COMMAND |
| TOUCH PANEL COMMAND INPUT | COMMAND |
| MOUSE COMMAND MODE INPUT | COMMAND |
| MOUSE HAND-WRITTEN CHARACTER INPUT | CHARACTER STRING |
| MOUSE DRAWING MODE INPUT | DRAWING (DRAW DATA) |
| MOUSE RASTER MODE INPUT | PICTURE (RASTER DATA) |
| MOUSE GESTURE COMMAND | COMMAND |
| PEN COMMAND MODE INPUT | COMMAND |
| PEN HAND-WRITTEN CHARACTER MODE INPUT | CHARACTER STRING |
| PEN DRAWING MODE INPUT | DRAWING (DRAW DATA) |
| PEN RASTER MODE INPUT | PICTURE (RASTER DATA) |
| PEN GESTURE COMMAND INPUT | COMMAND (OK, CANCEL, ETC.) |
| SCANNER DRAWING MODE INPUT | DRAWING (DRAW DATA) |
| SCANNER RASTER MODE INPUT | PICTURE (RASTER DATA) |
| CARD MAGNETIC INFORMATION MODE INPUT | MAGNETIC INFORMATION (CREDIT CARD, ETC.) |

A result interpreted in each input mode processor 112 is supplied to the input media processor 113. For example, the voice command input mode processing device analyzes the frequency of the supplied digital audio signal by, for example, fast Fourier transformation, to obtain feature parameter series. Then, for example, a complex likelihood method or a hidden Markoff model is used to recognize voice to obtain a word having the maximum likelihood from given recognition subject command words so as to transmit information of the word to the input media processor 113.

The input media processor 113 combines results of interpretation for each input mode from a user obtained from the input mode processor 112 for each abstract media unit to generate a unified input. Then, the input media processor 113 selects an input from a required media from a plurality of obtained media inputs while following an instruction from the media allocation controller 12 so as to supply an input command and data to the problem solving mechanism 15.

The input media processor 113 comprises mode-media interfaces 113c, input media processing elements 113a prepared for respective abstract media and a media selection switch 113b with which a result of processes performed by the input media processing elements 113a to be transmitted to the problem solving mechanism 15 is instructed. Each input media processing element 113a receives, as an input, output data (a result of interpretation in the abstract mode) from one or plural input mode elements through the mode-media interfaces 113c and unifies the inputs so as to transmit a result of interpretation as a media to the media selection switch 113b.

The media selection switch 113b follows an instruction issued from the interaction controller 13 to select a media output to be transmitted to the background application 15 and transmit the selected media output. For example, the mouse-object instruction-voice command media input processing element receives an output from the mouse-object instruction mode input processing element and an output from the voice command mode input processing element and combines the outputs so as to generate an interpretation as a media and transmits the generated interpretation. In an example case where the mouse-object instruction-voice command media has been selected, the media selection switch 113b transfers, to the problem solving mechanism 15, only the result of interpretation performed by the mouse-object instruction-voice command media.

Referring to FIG. 4, the output section 14 will now be described in detail. As shown in FIG. 4, the output section 14 comprises three modules; an output media processor 143, an output mode processor 142 and an output device processor 141.

The output media processor 143, which is the component of the output section 14, follows allocation information supplied from the interaction controller 13 to select output data from the problem solving mechanism 15 so as to allocate the output data to each of the abstract output media and process the same for each of the media. Then, the output media processor 143 divides and unifies data in output mode units so as to supply the data, to be treated in the output mode, to each output mode processing element 142a of the output mode processor 142.

To perform the foregoing process, the output media processor 143 comprises three modules; a media allocation switch 143b, output media processing elements 143a and media-mode interfaces 143c. The media allocation switch 143b follows an instruction issued from the interaction controller 13 and selects data, to be actually transmitted (to a user), from output data transmitted from the problem solving mechanism 15 so as to allocate the selected data to the abstract media processing element 143a.

The output media processor 143 has the output media processing elements 143a corresponding to the abstract output media so as to process output data, allocated to the medium in charge by the media allocation switch 143b, into a form which can be transmitted to the medium, and transmit the data. The media-mode interface 143c has media-mode interface elements as the components thereof, the media-mode interface elements corresponding to the abstract output modes. Each of the media-mode interface elements 143c unifies outputs from one or plural corresponding abstract media processing elements in charge by the mode so as to transmit and receive data to and from the corresponding output mode processing element 142a.

The output mode processor 142 has, as components thereof, output mode processing elements 142a for processing an output to each abstract output mode and mode-device interfaces 142b for unifying output data for each mode for each output device.

One output mode processing element 142a corresponds to one abstract output mode and processes, for each output mode, media data transmitted from the media-mode interface element 143c corresponding to the mode so as to transmit and receive the processed data to and from the mode-device interface 142b.

One mode-device interface element 142b corresponds to one output device element and unifies outputs from one or plural abstract device processing elements in charge by the device so as to transmit and receive data to and from the corresponding output device processing element.

The output device processor 141 has output device processing elements prepared for respective output devices as the components thereof. Each output device processing element uses output data from a corresponding media-device interface as an input command and data so as to operate an output device which is in charge by the output device processing element.

Referring to FIG. 3, the media allocation controller 12 and the interaction controller 13 will now be described in detail. As shown in FIG. 3, the media allocation controller 12 of the multimodal interaction apparatus 10 according to the present invention comprises four elements; a module called a media allocation generator given reference numeral 121, a next media allocation selection table given reference numeral 122, a current media allocation slot given reference numeral 123 and a mode-media allocation correspondence table given reference numeral 124.

Among the four elements, the media allocation generator 121 makes a reference to the next media allocation selection table 122 in accordance with data to be actually supplied to the application, data combination (media allocation) and inquiry from the interaction controller 13 to generate data to be actually supplied to the user and an appropriate data combination, that is, an expression method and transmit the generated data and combination to the interaction controller 13.

As shown in FIG. 3, the interaction controller 13 of the multimodal interaction apparatus 10 according to the present invention receives, as events, input and output mode states obtainable from the input media processor 113 and the output media processor 143, a state of data exchange which is being performed with the problem solving mechanism (the background application) 15, notification of a state of the problem solving mechanism 15 supplied from the problem solving mechanism 15, requirements for input and output from the problem solving mechanism 15, characteristic information common to plural users and information about a method of controlling the problem solving mechanism 15 so as to generate interaction plan in accordance with the supplied information.

During the process for executing the plan, instructions are issued to the input media processor 113, the output media processor 143 and the problem solving mechanism 15 to control the method, that is, flow, of the interaction between the user and the system.

An example of a process of the foregoing type will now be described. If transmission and receipt of information with another module, such as the input media processor 113, the output media processor 143, the problem solving mechanism (background application) 15 and the media allocation controller 12, is considered as interaction, a method using a state transition model may be available which has been employed in a voice interaction system disclosed in, for example, Japanese Patent Publication (KOKAI) No. 5-216618. A hierarchy plan synthesizing method as disclosed in, for example, "A Structure for Plans and Behavior" written by Sacerdoti, E. d. issued by American Elservier, 1977, may be employed to realize the process.

The interaction controller 13 has a module called interaction planner given reference numeral 131. The interaction planner 131 comprises two storage tables, that is, interaction rule table 132 and interaction primitive table 133, and three storage elements; a plan memory 134, an initial target slot 135 and a current target slot 136. Thus, the interaction planner 131 constitutes and performs interaction plan.

Figure 6:
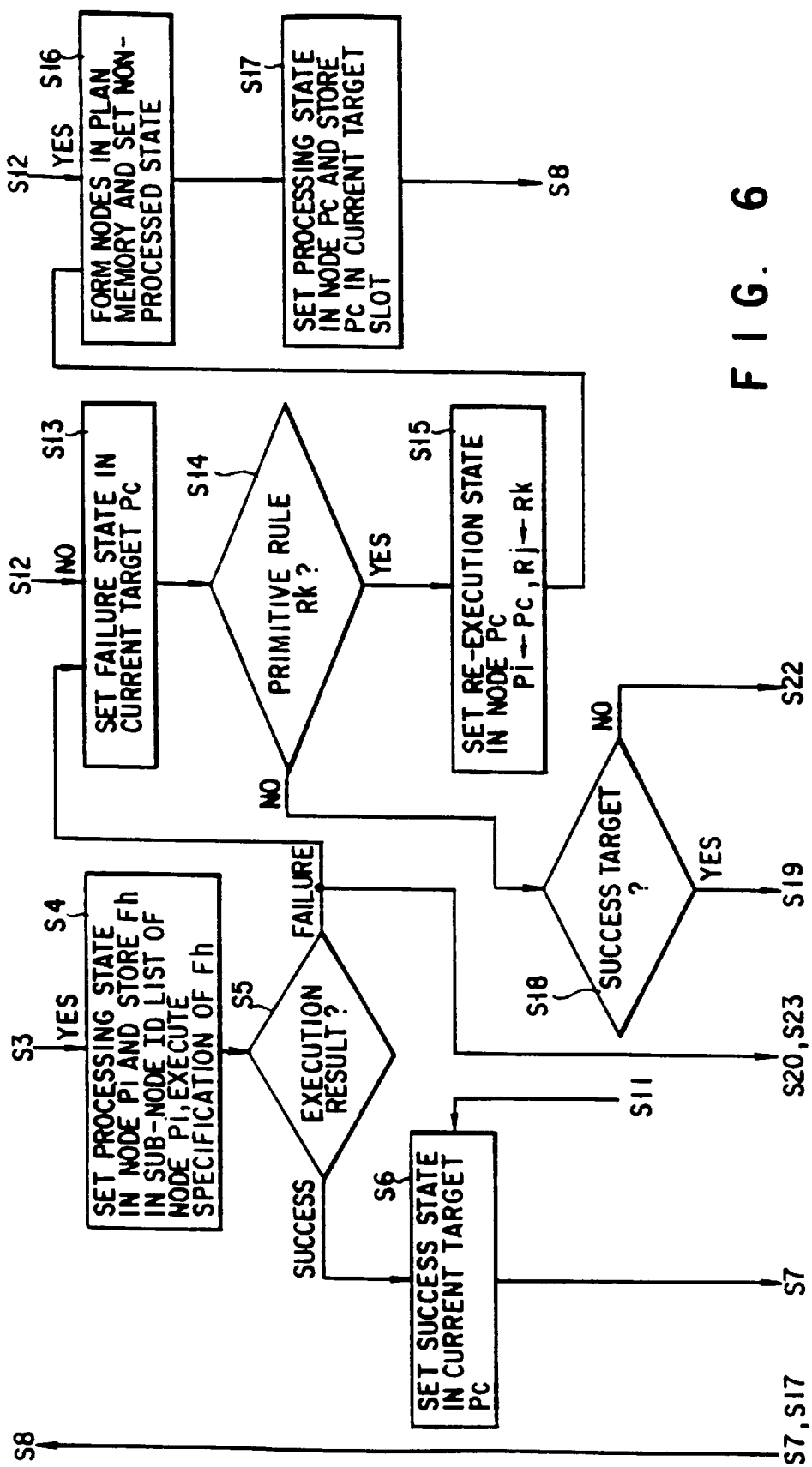
Figure 7:
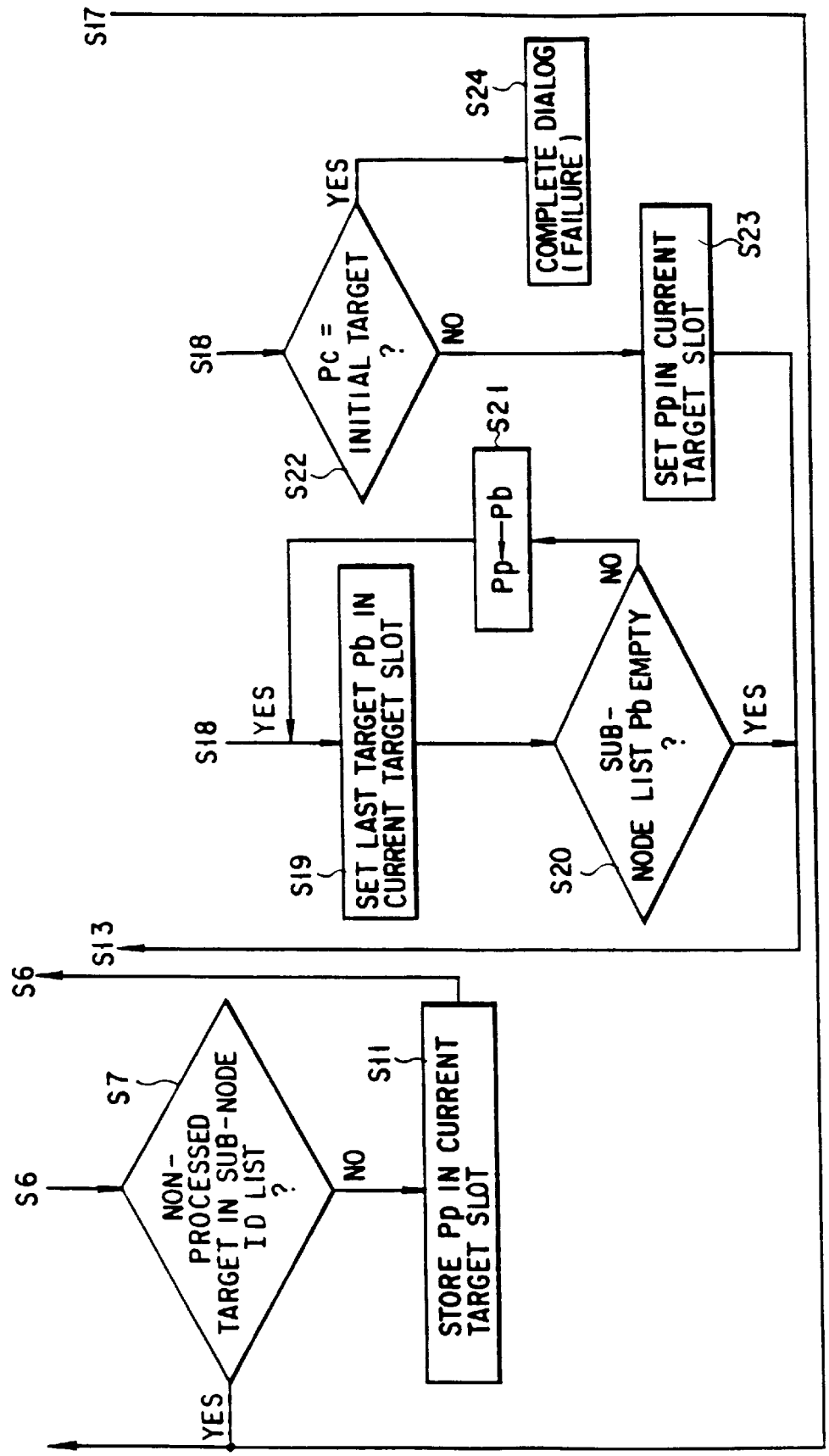

The multimodal interaction apparatus according to the present invention has the foregoing structure and functions. The operation of the interaction controller 13, which is the essential module of the multimodal interaction apparatus according to the present invention will now be described. FIGS. 5 to 7 show a flow chart of the operation of the interaction controller 13. Referring to the flow chart, the principle of the operation of the multimodal interaction apparatus and a method of using data will now be described.

When the multimodal interaction apparatus has been turned on, the interaction planner 131 of the interaction controller 13 fetches an initial target from the initial target slot 135 in which initial targets for generating plans have been set (step S1). In accordance with the target, the interaction planner 131 sequentially develops all interaction plans in the plan memory 134 in the interaction controller 13 (step S2 and following steps). The contents of the plan memory 134 which is in a standby state are shown in TABLE 3.

TABLE 3

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | PROCESSING | [p11, p12] | |
| p02 | MA SELECTION (INITIAL) | UNPROCESSED | | |
| p03 | START SESSION | UNPROCESSED | | |
| p04 | TASK EXECUTION | UNPROCESSED | | |
| p05 | END SESSION | UNPROCESSED | | |
| p11 | MA SELECTION (WAITING) | SUCCESS | [p111, p112] | WAITING |
| p12 | DETECTION WAITING | PROCESSING | [ ] | |
| p111 | MA INQUIRE | SUCCESS | [ ] | MA1 = |
| p112 | (WAITING, MA1) MA SETTING (WAITING) | SUCCESS | [ ] | WAITING |

One item in the plan memory 134 comprises five slots consisting of "NODE ID", "TARGET", "STATE", "SUB-NODE ID LIST" and "RESULT", the one item being called a "plan node". When one target has been determined, one plan node is generated, and the set target is substituted in the target slot. Then, a unique symbol for each plan node is allotted to the node ID slot.

Any one of five states "NON-PROCESSED", "BEING PROCESSED", "SUCCESS", "FAILURE" and "RETRIAL" is substituted in the state slot.

The sub-node ID list slot stores the ID of the plan node corresponding to the sub-target developed from the contents of the target slot, the ID being stored in the form of a list.

The result slot stores a result of execution of the target of the plan node to which the slot belongs. A plan node having the "node ID slot", the value of which is p000, will be hereinafter expressed simply as "plan p000" or "sub-plan p000".

To develop a certain interaction target into its sub-target, the interaction controller 13 has interaction rule table 132. The interaction rule table 132 has a plurality of items expressing interaction rules shown in TABLE 4, each of the plural items being called interaction rule node.

TABLE 4

| RULE ID | TARGET | APPLICATION CONDITION | SUB-TARGET LIST |
|---|---|---|---|
| r00 | INTERACTION SESSION | | USER DETECTION, MA SELECTION(INITIAL), START SESSION, TASK EXECUTION, END SESSION |
| r01 | TASK EXECUTION | | INITIAL CONDITION INPUT, SEARCH, CANDIDATE DETERMINATION, CANDIDATE CONFIRMATION |
| r02 | INITIAL CONDITION INPUT | | INPUT REQUEST (A→D, INPUT VARIABLE LIST), MA SELECTION (INPUT REQUEST (INPUT VARIABLE LIST)), INPUT PROCEDURE (INPUT VARIABLE LIST) |
| r03 | START SESSION | | START REQUEST (U→S), START CONFIRMATION (S→U) |
| r04 | START SESSION | | START REQUEST (S→U), START CONFIRMATION (U→S) |
| r05 | END SESSION | | END REQUEST (U→S), END CONFIRMATION (S→U) |
| r06 | END SESSION | | END CONFIRMATION (S→U) |
| r07 | CANDIDATE DETERMINATION | NUMBER OF CANDIDATES = 1 | |
| r08 | CANDIDATE DETERMINATION | | SELECTION REQUEST |
| r09 | CANDIDATE DETERMINATION | | SEARCH CONDITION LIMIT, SEARCH, CANDIDATE DETERMINATION |
| r10 | SELECTION REQUEST | | MA SELECTION, SELECTION ITEM PRESENTATION, USER SELECTION |
| r11 | USER DETECTION | | MA SELECTION (WAITING), DETECTION WAITING |
| r12 | MA SELECTION (CONDITION) | | MA INQUIRE.(CONDITION, MA1), MA SETTING (MA1) |
| r13 | EXPRESSION FORMAT CHANGE REQUEST (U→S) | | MA SELECTION, DATA OUTPUT |
| r14 | SEARCH CONDITION LIMIT | | NON-INPUT VARIABLE INQUIRE (D→A, NON-INPUT VARIABLE LIST), NUMBER→(INPUT VARIABLE, INPUT VARIABLE LIST), ADDITIONAL CONDITION INPUT (INPUT VARIABLE, {LIMIT SEARCH}) |
| r15 | SELECTION REQUEST | MA REQUEST (MA, U→S) | MA SELECTION (USER REQUEST(MA)), SELECTION ITEM PRESENTATION, USER SELECTION |
| r16 | SELECTION REQUEST | SEARCH CONDITION | MA SELECTION ( ) |

TABLE 4-continued

| RULE ID | TARGET | APPLICATION CONDITION | SUB-TARGET LIST |
|---|---|---|---|
| | | CHANGE REQUEST (CONDITION) | |
| r17 | ADDITIONAL CONDITION INPUT (INPUT VARIABLE, INPUT OBJECT) | | MA SELECTION (ADDITIONAL CONDITION INPUT (INPUT VARIABLE, INPUT OBJECT)), INPUT OBJECT PRESENTATION (D→U, [ADDITIONAL CONDITION INPUT, INPUT OBJECT]), INPUT PROCEDURE (INPUT VARIABLE) |
| r18 | INPUT PROCEDURE (INPUT VARIABLE) | | VARIABLE INPUT (INPUT VARIABLE) |
| r19 | INPUT PROCEDURE (INPUT VARIABLE) | | RE-INPUT REQUEST, VARIABLE INPUT (INPUT VARIABLE) |
| r20 | INPUT PROCEDURE (INPUT VARIABLE ), RE-INPUT REQUEST | | MA SELECTION (INPUT FAILURE (INPUT VARIABLE)), VARIABLE INPUT (INPUT VARIABLE) |

One interaction rule node comprises four slots; "RULE ID", "TARGET", "APPLICATION CONDITION" and "SUB-TARGET LIST". Similarly to the node ID of the plan node, a symbol unique for each interaction rule is allocated to the "RULE ID".

Each interaction rule node stores, in the target slot thereof, a target to be achieved by the rule. A series of (plural in general) sub-targets, which are generated due to development of the target, is stored in the sub-target list slot of each interaction rule node, while conditions for applying the rule are stored in the application condition slot.

The interaction planner 131 sequentially and downwards searches the interaction rule stored in the interaction rule table 132 to apply a first interaction rule that satisfies the condition. The interaction plan is generated and executed by recursively repeating a process in which a rule satisfying a given target is searched from the interaction rules; the rule is applied; the rule is developed into a sub-target; and the rule is executed.

If the initial target is satisfied finally, the interaction succeeds and the operation of the multimodal interaction apparatus is interpreted. Interaction rule node having the rule ID slot, the value of which is "r00", is hereinafter expressed simply as "interaction rule r00" or "rule r00".

The interaction planner 131 stores a target of the interaction at a certain point of time in the current target slot to control the target. Prior to searching the interaction rule to which the target of the current target slot is developed, the interaction planner 131 searches interaction primitive table 133 storing interaction primitives, which are the minimum units which can be directly executed, as shown in TABLE 5.

TABLE 5

| FACT ID | TARGET | SPECIFICATION |
|---|---|---|
| f01 | MA INQUIRE (CONDITION) | MEDIA ALLOCATION CONTROLLER CALL (CONDITION) |
| f02 | DETECTION WAITING | |
| f03 | MA SETTING | |

TABLE 5-continued

| FACT ID | TARGET | SPECIFICATION |
|---|---|---|
| f04 | (MA) VARIABLE INPUT (VARIABLE) | INPUT MEDIA PROCESSOR CALL (INPUT REQUEST (VARIABLE)) |

One item of the interaction primitive table 133 is called a "interaction primitive node", which comprises three slots; "FACT ID", "TARGET" and "SPECIFICATION".

In a case where the contents of the current target slot can be unified into the value of the target slot of a certain interaction primitive in the interaction primitive table 133, the interaction planner 131 considers the target as the interaction primitive and executes the contents described in the specification slot of the corresponding interaction primitive node.

The interaction primitive between modules to be controlled and executed by the interaction controller 13 is any one of inquiry of an appropriate media allocation to the media allocation controller 12, its answer, commands for setting to be issued to the input and output media elements, input and output commands to be issued to the same, and requirements for input and output to be made for the problem solving mechanism 15.

Interaction primitive node having a fact ID slot, the value of which is f00, is hereinafter expressed simply as "interaction primitive f00" or "fact f00".

In a case where no interaction primitive which can be unified into a target at a point of time when interaction plan is developed and executed nor interaction rule exist, the target fails.

If a target fails, the interaction planner 131 backtracks the development process of the interaction plan and performs retrial of the interaction rule by a method similar to backtracking of a computing tree during a process of executing "Prolog Language" which is a computer program language.

That is, if execution of a certain interaction target Pi by applying interaction rule Rj fails, the interaction planner 131 searches another interaction rule, which can be applied to Pi, or interaction primitive.

If an applicable interaction rule or interaction primitive exists, the interaction rule or the interaction primitive is applied to perform retrial of the target to satisfy Pi.

If all interaction rules and interaction primitives applicable to Pi fail, the interaction planner 131 backtracks to the interaction target Pc, which has succeeded immediately before the interaction target Pi to perform retrial of the interaction target Pc. As long as failure continues, backtracking of the target is successively generated. If the initial target fails after backtracking to the initial target has been performed, the interaction fails, and the operation of the multimodal interaction apparatus is interpreted.

The media allocation controller 12 is, in the form of execution of interaction primitive "MA INQUIRY", which is an inquiry of multimedia allocation (MA), called by the interaction controller 131. The media allocation controller 12 uses a state of media allocation at a point of time when the inquiry stored in the current media allocation slot has been generated and a next media allocation selection table 122 structured as shown in TABLE 6 (next media allocation selection table) so as to determine media allocation which is an appropriate allocation at the point of time.

"CURRENT MEDIA ALLOCATION", "CONDITION" and "NEXT MEDIA ALLOCATION".

The media allocation generator 121 searches the next media allocation selection table 122 to obtain a next media allocation selection node which satisfies the contents of the current media allocation slot and condition when the media allocation controller 12 has been called so as to generate a candidate for the next media allocation.

The media allocation generator 121 searches the contents of the next media allocation slot of the detected next media allocation selection node to obtain a mode-media allocation correspondence table 124 as shown in TABLE 7 to verify the limitation conditions when a certain media allocation is applied. One item of the mode-media allocation correspondence table 124 is called a "mode-media allocation correspondence node". Each of the mode-media allocation correspondence node comprises four slots; "NODE ID", "ALLOCATED MEDIA NAME", "LIMITATION" and "INPUT AND OUTPUT MODE PAIR".

TABLE 6

| NODE ID | CURRENT MEDIA ALLOCATION | CONDITION | NEXT MEDIA ALLOCATION |
|---|---|---|---|
| m01 | | CALL CONDITION = WAITING | WAITING |
| m02 | | CALL CONDITION = INITIAL | HUMAN |
| m03 | | CALL CONDITION = INPUT REQUEST | VARIABLE SPEECH INPUT SCREEN SPEECH OUTPUT |
| m04 | | CALL CONDITION = SELECTION REQUEST & NUMBER OF ELEMENTS $\leq$ 4 | TOUCH PANEL DISPLAY SELECTION, ELEMENT NAME SPEECH READING |
| m05 | | CALL CONDITION = SELECTION REQUEST & 5 $\leq$ NUMBER OF ELEMENTS $\leq$ 100 | TABLE FORMAT TOUCH PANEL DISPLAY SELECTION, NUMBER OF SEARCH RESULTS SPEECH OUTPUT |
| m06 | (SPOKEN LANGUAGE, XXX) | CALL CONDITION = INPUT FAILURE | (PEN CHARACTER STRING, XXX) |

One item of the next media allocation selection table 122 is called a "next media allocation selection node". Each next media allocation selection node has four slots; "NODE ID",

TABLE 7

| NODE ID | ALLOCATED MEDIA | LIMITATION | INPUT/OUTPUT PAIR |
|---|---|---|---|
| mm01 | HUMAN | SPEECH INPUT/OUTPUT ENABLE | (SPOKEN LANGUAGE, SPOKEN LANGUAGE + FACE IMAGE) |
| mm02 | WAITING | INPUT SENSOR UTILIZATION ENABLE | (SENSOR DETECTION WAITING, WAITING MESSAGEA) |
| mm03 | VARIABLE SPEECH INPUT SCREEN SPEECH OUTPUT | TYPE OF VARIABLE $\in$ (DATE, INT, MONEY) &NUMBER OF INPUT VARIABLES $\leq$ 4 & SPEECH INPUT ENABLE | (SPOKEN LANGUAGE, SPOKEN LANGUAGE + VARIABLE SCREEN DISPLAY) |
| mm04 | PEN CHARACTER STRING INPUT - HUMAN CORRESPONDING | SPEECH OUTPUT ENABLE | (PEN CHARACTER STRING, SPOKEN LANGUAGE + FACE IMAGE) |
| mm05 | TOUCH PANEL DISPLAY SELECTION - ELEMENT NAME READING | N (NUMBER OF ELEMENT) $\leq$ 4 | (N ELEMENTS TOUCH PANEL (PARALLEL), SPOKEN LANGUAGE (N ITEMS) + N ELEMENTS PARALLEL ARRANGEMENT) |
| nm06 | TABLE FORMAT TOUCH PANEL DISPLAY | 5 $\leq$ N (NUMBER OF ELEMENTS) $\leq$ 100 | (N ELEMENTS TOUCH PANEL (TABLE FORMAT), SPOKEN LANGUAGE (N ITEMS) + |

TABLE 7-continued

| NODE ID | ALLOCATED MEDIA | LIMITATION | INPUT/OUTPUT PAIR |
|---|---|---|---|
| | SELECTION - READ BY SPEECH OF NAME OF SEARCH RESULTS | | N ELEMENTS TABLE OUTPUT) |

When the media allocation generator 121 verifies the limitation of the media allocation, it searches a mode-media allocation correspondence node that coincides with the media allocation name which is searched by the media allocation name slot so as to fetch the limitation when the media allocation described in the limitation slot of the mode-media allocation correspondence node is actually executed. The media allocation generator 121 verifies whether the state when the inquiry has been performed satisfies the foregoing limitation.

If the limitation is satisfied, the media allocation candidate is selected as a next media allocation and reply of the selection to the interaction planner 131 is performed. The media allocation generator 121 requested to determine media allocation searches the next media allocation selection table in such a manner that if a value of the current media allocation slot of a certain media allocation node or that of the condition slot is a negative value, then the media allocation generator 121 does not use the value of the slot in the verification.

For example, a next media allocation node having the current media allocation slot, the contents of which is "–", can be applied regardless of the value of the current media allocation slot if the contents of the limitation slot and those of the limitation slot of the mode-media allocation correspondence table coincide with each other. In place of the contents of the media allocation, a pair of an input medium and an output medium can be described in the current media allocation slot and the next media allocation slot of the next media allocation node.

Moreover, a variable may be employed as the input media or the output media. In a next media allocation selection node shown in TABLE 6 and having the node ID slot, the value of which is "m06", the value of the current media allocation slot is "(SPOKEN LANGUAGE, XXX)" and the value of the next media allocation slot is "(PEN CHARACTER STRING, XXX)". However, the next media allocation selection node may be applied regardless of the output media if the media allocated input media, which is the value of the current media allocation slot, that is, the input media which is set at present, is a "SPOKEN LANGUAGE".

At this time, the value of the output media of the current media allocation slot is temporarily substituted in the value of the output media of the current media allocation slot, that is, variable "XXX". The result of the substitution is reflected to the next media allocation selection node to which the current media allocation slot belongs.

The search and verification of the next media allocation slot are performed in such a manner that the correspondence with the values of the input and output media slots in the mode-media allocation correspondence table is made. It is assumed that a call condition is "input failure" and the media allocation generator 121 is called when the value of the current media allocation slot is "HUMAN".

To determine the next media allocation, the media allocation generator 121 initially searches the next media allocation selection table 122. However, the next media allocation selection nodes having the node ID slots, the value of which are m01 to m05, among the next media allocation selection nodes shown in TABLE 6 are not selected because the conditions are not met.

Then, the media allocation generator 121 intends to verify whether the next media allocation selection node, having the node ID slot, the value of which is m06, can be applied. Since the value of the current media allocation slot of the next media allocation selection node, however, is described in the form of the pair of the input media and the output media, the media allocation generator 121 reconstitutes the value of the current media allocation slot into a pair of the input media and the output media.

To reconstitute the value, the media allocation generator 121 searches TABLE 7. Since the value of the media allocation slot of the mode-media allocation correspondence node, having the node ID slot, the value of which is mm01, is "HUMAN" which is the same as the value of the current media allocation slot, the media allocation generator 121 obtains a fact that the input media and the output media form a pair consisting of the input media of the allocated media "HUMAN", which is solely "SPOKEN LANGUAGE" mode, and the output media, which is a combination of "SPOKEN LANGUAGE" mode and "FACE IMAGE" mode, that is, "(SPOKEN LANGUAGE, SPOKEN LANGUAGE+FACE IMAGE)" from the value of the input and output mode slot of the mode-media allocation correspondence node.

The media allocation generator 121 uses the foregoing information to intend to unify with a value "(SPOKEN LANGUAGE, XXX)", which is the value of the current media allocation slot of the next media allocation selection node having the node ID, the value of which is m06, such that "SPOKEN LANGUAGE+FACE IMAGE" is temporarily substituted in the variable XXX.

The substitution is reflected on the next media allocation slot of the next media allocation selection node so that the value of the slot is made to be "(PEN CHARACTER STRING, SPOKEN LANGUAGE+FACE IMAGE)".

Then, the media allocation generator 121 verifies "CALL CONDITION=INPUT FAILURE" which is a value of the condition slot of the same next media allocation selection node. In this case, the verification succeeds. Then, the media allocation generator 121 searches the mode-media allocation correspondence table shown in TABLE 7 to verify the limitation of the mode-media allocation correspondence node having the input and output mode slot, the value of which is "(PEN CHARACTER STRING, SPOKEN LANGUAGE+FACE IMAGE)".

If the limitation is satisfied, selection of the next media allocation succeeds so that media allocation "PEN CHARACTER STRING INPUT-HUMAN CORRESPONDENCE" which is the value of the media allocation name slot of the mode-media allocation correspondence node is substituted in the current media allocation slot. The media allocation is, as a result of media allocation, returned to the interaction controller 13.

The temporal substitution into the variable "XXX" is canceled when the verification of the next media allocation selection node, to which the variable belongs, is completed.

A next media allocation selection node having a node ID slot, the value of which is, for example, m00, is hereinafter simply expressed as "next media allocation selection node m00". A mode-media allocation correspondence node having the ID slot, the value of which is mm00, is hereinafter expressed as "mode-media allocation correspondence node mm00".

Figure 8:
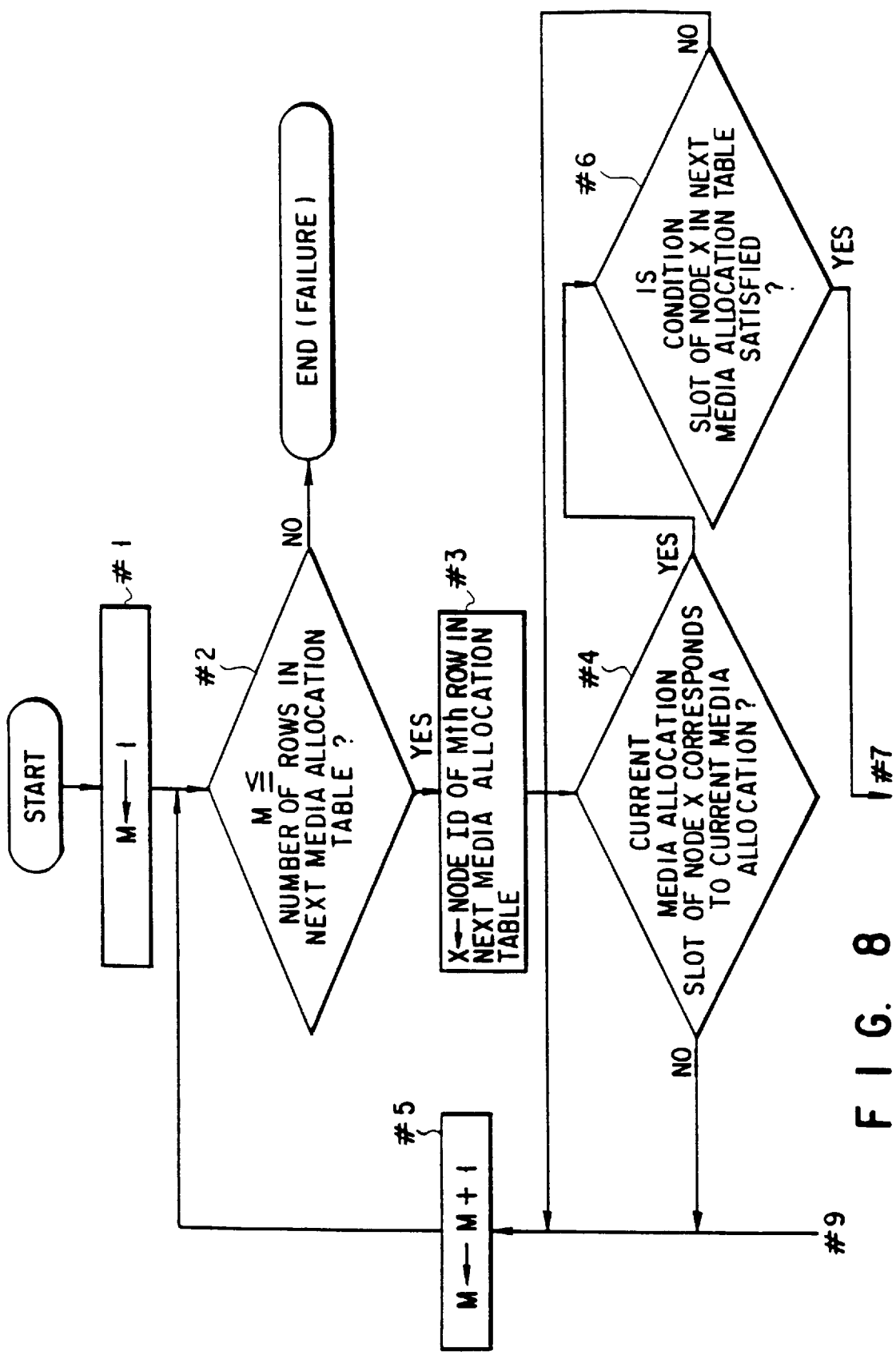

A schematic procedure of a process to be performed by the media allocation controller 12 is shown in FIGS. 8 and 9. When a requirement for media allocation results in the media allocation controller 12 being called, the media allocation controller 12 initially refers to the next media allocation selection table (shown in TABLE 6) to search a candidate of the next media allocation. The reference to the next media allocation selection table is performed sequentially from the first line (1 is set to M in step #1, after the reference has been completed, the value of M is increased by one in step #5, and then the operation returns to step #2). Although the next media allocation cannot be determined (step #2) after all nodes (nodes on all lines) of the next media allocation selection table have been searched, a determination is performed that the operation fails and the operation is ended here.

The reference to the next media allocation selection table is performed such that a verification whether the contents of the media allocation, which is set for each line at present, and the contents of the current media allocation slot coincide with each other or whether the contents can be made to be the same (step #4) and a verification whether the contents of the condition slot are satisfied (step #6) are initially performed. If either of the two states is not satisfied, verification of a next line is performed (step #5).

As for a candidate for the next media allocation of the line, which has passed the verifications in steps #4 and #6, a reference is made to the mode-media allocation correspondence table (TABLE 7) to verify whether the candidate is appropriate as the next media allocation. Moreover, information about the pair of the input and output modes to which the media allocation belongs is obtained.

The reference to the mode-media allocation correspondence table is, similarly to the reference to the next media allocation selection table, performed sequentially from the first line (1 is set to N in step #8, after the reference has been completed the value of N is increased by one in step #13, and the operation returns to step #9). If the candidate of the next media allocation is determined to be inappropriate (step #9), the operation returns to the reference of the next media allocation selection table (step #5).

The reference to the mode-media allocation correspondence table is performed such that a line in which a candidate of the next media allocation is described in the media allocation slot is searched (step #11) and whether the contents of the limitation slot of the line are satisfied is verified (step #12). If the limitation slot is satisfied, the candidate is determined as the next media allocation (step #14) so that determination of the media allocation is completed. The input and output mode pair corresponding to the determined media allocation has been described in an input and output mode pair slot of the corresponding line in the mode-media allocation correspondence table.

With reference to a specific example, the operation of the present invention will now be described. The description will be performed about an example in which the present invention is applied to an application of a hotel guide in a tourist resort. The hotel guide application in the tourist resort corresponds to the foregoing problem solving mechanism 15. The following scenario is assumed here.

Scenario

Scene 1:

A traveler stands in front of a guidance system. A sensor responds to the traveler and a display is turned on to display a title screen of the system. An input prompt is displayed as well as sound effects being generated.

Scene 2:

The traveler voices an inquiry to the system.

Traveler (T1): "I am seeking a hotel."

System (S1): "I see."

Scene 3: Interaction for acquiring initial data

System (S2): "From when do you wish to make a reservation?"

Traveler (T2): "Today."

System (S3): "When will you leave?"

Traveler (T3): "The day after tomorrow."

System (S4): "How many rooms do you need?"

Traveler (T4): "One room since I am alone."

System (S5): "How much is your budget for one night?"

Traveler (T5): "Not more than 60 pounds."

System (S6): "I see. You wish to stay three nights from today until Friday, Jul. 19, 1996 at a hotel not more than 60 pounds per night.

"Traveler (T6): "Yes."

System (S7): "Please, wait for a minute while a search is being conducted."

Scene 4A: Presentation of candidates (where the number of candidates is small)

System (S8): "Sorry for waiting. There are three hotels available from today that match your criteria, as shown on the screen; THE OCEAN LODGE, THE GREEN INN, and THE CROWN HOTEL. If you wish to know the details of each hotel, please speak the name of the hotel or touch the mark on the screen."

Scene 5: User initiative interaction

Traveler (T7): "I wish to know the way to each hotel and how long it takes."

System (S9): "You can reach the OCEAN LODGE in one and half hours by bus, the GREEN INN in thirty minutes by train and thereafter thirty minutes by bus, the CROWN HOTEL in thirty minutes by foot."

If the number of candidates is large, the Scene 4A is replaced by the following Scenes 4B and 4C. The Scene 5 follows the Scene 4C.

Scene 4B: Proposal to limit the number of candidates (where the number of candidates is large.)

System (S10): "Since the number of candidates is five hundred and thirty four, let's limit the search condition. Where are you planning to visit?"

Scene 4C: Countermeasure for failure of speech recognition

Traveler (T8): "Loch Ness (lak ness) famous for Nessie."

System (S11): "I beg your pardon. Please speak again."

Traveler (T9): "Loch Ness (lak ness)!!"

System (S12): "I do not recognize your word. Please spell the name of your desired destination."

Traveler: Spelling

System (S13): "I see. You wish to visit Loch Ness (lakness)"

Traveler (T10): "Yes"

System (S14): "Please wait for a minute while a search is conducted."

The interaction rule table 132 of the interaction controller 13 has stored the interaction rules shown in TABLE 4 and the interaction primitives shown in TABLE 5. The initial target slot has been previously supplied with an initial target as "interaction session" and the initial target has been stored.

After the multimodal interaction apparatus according to the present invention has been turned on, the interaction planner 131 fetches the initial target from the initial target slot and calls rule "r00" which satisfies the target. Then, the interaction planner 131 develops the interaction rule "r00" as shown in TABLE 8 (plan memory 134 at initial or start).

media selection switch 113b and the output media processing element 143a so that the input and output channels are set.

Figure 10:
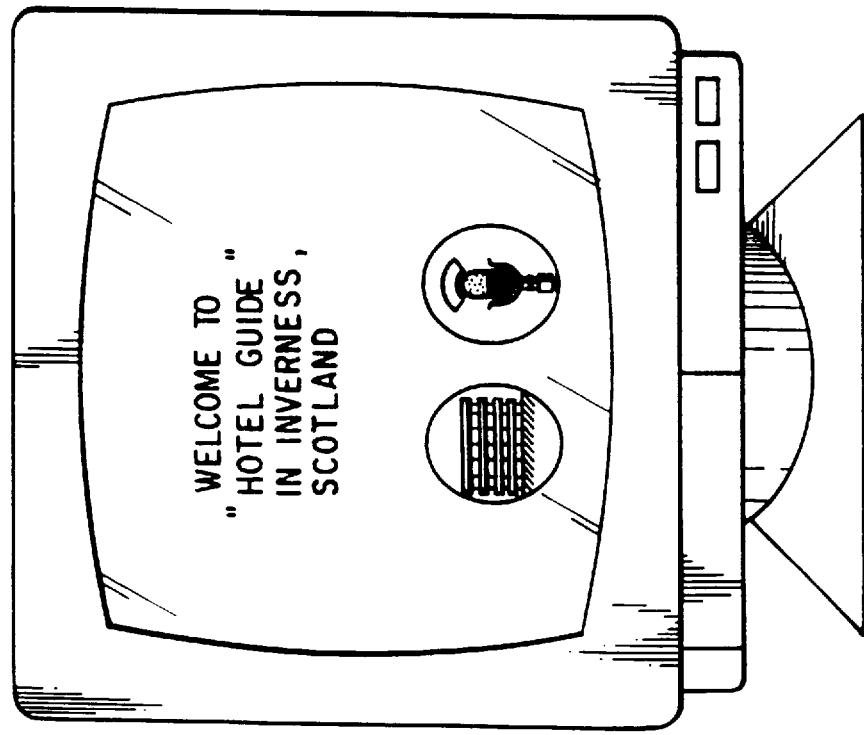
FIG. 10 shows an example of display in a standby state.

In the foregoing case of the standby media allocation, only the human detecting sensor is opened, and the output channel transmits, to the screen, a standby message as shown in FIG. 10.

As a result of the process, the sub-target "p11" succeeds, and the interaction planner 131 intends to execute the next target "DETECTION STANDBY". Since the foregoing sub-target is the interaction primitive as recorded in the interaction primitive table 133 shown in TABLE 5, it is immediately executed.

At this time, the state of the plan memory 134 in the interaction controller 13 is made to be as shown in TABLE 3. The interaction primitive "USER DETECTION" continues the standby state until the state of the human detection sensor media is changed.

TABLE 8

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | PROCESSING | [ ] | |
| p02 | MA SELECTION (INITIAL) | UNPROCESSED | | |
| p03 | START SESSION | UNPROCESSED | | |
| p04 | TASK EXECUTION | UNPROCESSED | | |
| p05 | END SESSION | UNPROCESSED | | |

The interaction planner 131 calls user detection, which is the first sub-target, so that interaction rule "r11" is developed and then interaction rule "r12" is developed. When sub-target "MA INQUIRY (STANDBY, MA1)" is performed, the interaction planner 131 searches the interaction primitive table 133 shown in TABLE 5 because an applicable interaction rule is not contained in the interaction rule table 132.

As a result, the interaction planner 131 detects interaction primitive "f01" and executes "CALL OF MEDIA ALLOCATION CONTROLLER" contained in the specification of the foregoing interaction primitive. Then, the interaction planner 131 inquires of the media allocation controller 12 the media allocation which satisfies the call conditions and which can be used at the point of time.

In accordance with the media allocation and the media, which can be used at the point of time, the media allocation controller 12 refers to the next media allocation selection table 122 structured as shown in TABLE 6 to determine media allocation to be selected next. In the foregoing case, table element "m01" is applied, and media allocation "standby" is selected.

Then, the media allocation controller 12 refers to the mode-media allocation correspondence table shown in TABLE 7 to confirm the limitation occurring when the corresponding media allocation is applied. If an input sensor unit can be used, the media allocation controller 12 finally selects the media allocation "standby" and makes a reply to the interaction controller 13.

In accordance with the media allocation replied from the media allocation controller 12, the interaction controller 13 notifies the input media processor 113 and the output media processor 143 the media to be used respectively. The input media processor 113 and the output media processor 143 follow the notifications and refer the mode-media allocation correspondence table to respectively change the states of the When a user stands in front of the apparatus, the input sensor reacts so that the interaction primitive "USER DETECTION" succeeds, the sub-plan "p01" is satisfied and the next sub-target "MA SELECTION (INITIAL)" is called. The sub-target is then developed with "r12". Similarly to the selection of the standby media, the interaction planner 131 calls the media allocation controller 12 to execute the sub-target "MA INQUIRY" so as to inquiry media allocation for the purpose of starting the interaction.

Similarly to the standby media allocation process, the media allocation controller 12 makes a reference to the next media allocation selection table 122 and the mode-media allocation correspondence table 124 thereof to select media allocation that satisfies the condition and the limitation.

Figure 11:
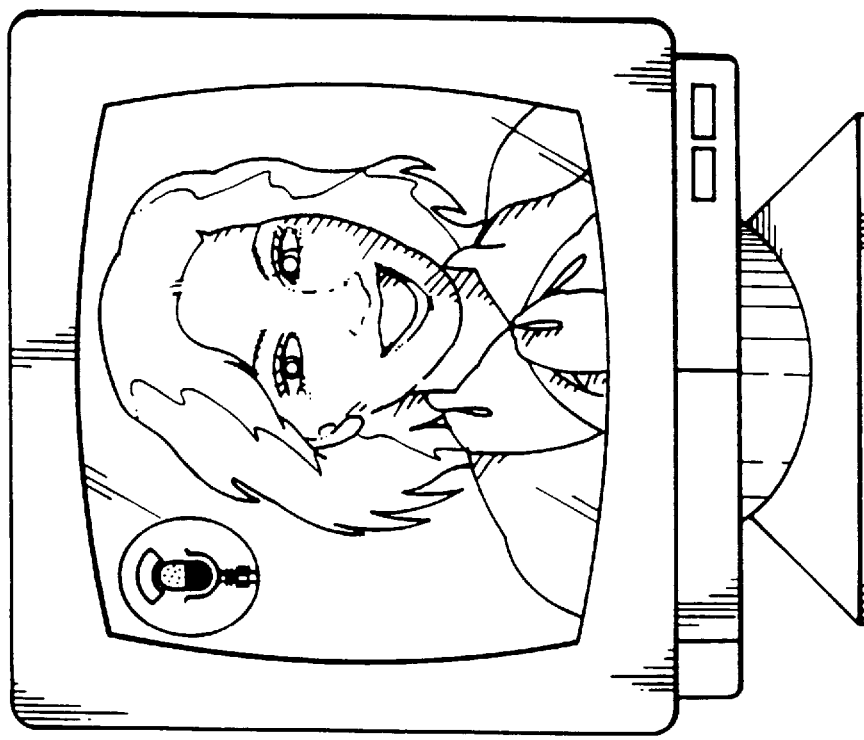
FIG. 11 shows an example of display of media allocation "HUMAN"

As a result, media allocation "HUMAN" is selected in this case and the result of the selection is replied to the interaction controller 13. The interaction controller 13 instructs the replied media allocation to the input media processor 113 and the output media processor 143 so as to perform interaction in accordance with the media allocation "HUMAN". An example of display in the foregoing case is shown in FIG. 11.

The media allocation "HUMAN" is media allocation, the input of which is speech recognition and the outputs of which are face image and spoken language, so as to be capable of performing natural interaction by means of speech. Therefore, a user is required to simply make question, requirement, reply and answer by means of voice thereof. The apparatus performs reply and answer such that the face image is displayed on the display unit with spoken language to enable the human being to easily understand and handle the interaction.

If data, indicating that background noise is too intense to employ the speech input mode or the speech output mode, is supplied from the input media processor 113 or the output media processor 143 to the media allocation controller 12 in the foregoing case for example, the media allocation "HUMAN" is not selected but another media allocation is performed to continue the interaction. For example, the input is performed with the keyboard and the output is performed by character display on the screen to eliminate influence of the background noise.

Since the present invention has the structure such that the means for determining an appropriate media allocation is added to the conventional multimodal interaction apparatus, appropriate input and output media can dynamically be selected to be adaptable to the interaction situation and the input and output means that can be used at a point of time. As a result, an interface that can be operated more easily and which is adaptable to the situation can be provided for a user.

The foregoing multimodal interaction apparatus has the structure such that the multimodal interaction apparatus dynamically selects optimum input and output media from a variety of media to be adaptable to the situation at a point of time so as to provide an interface, which can easily be operated, for a user. Another structure may be employed in which the user is enabled to arbitrarily select and instruct the media to provide an interface that can easily be used for each user.

To form the structure of the multimodal interaction apparatus in such a manner that a user arbitrarily selects and instructs input and output media, a means for indicating media, with which the user is able to input information, is required to be added to the foregoing structure. By employing the foregoing structure, the user is able to easily recognize the input means permitted to be used. Thus, an interface that can be operated more easily can be provided.

When the foregoing media allocation "HUMAN" is performed, for example, a microphone icon is displayed on the screen to cause the user to recognize that speech input can be performed, as shown in FIG. 11. Thus, an effect for causing the speech input to be performed can be obtained. During the process in which sub-target "START SESSION" is satisfied with the interaction rule "r03", the user's requirement to start the session and the confirmation of the system are performed. Thus, the process of Scene 1 (a traveler stands in front of the system) to Scene 2 (the traveler voices an inquiry to the system) of the foregoing scenario can be executed.

After the start session, the contents of which have been described above, has succeeded, the interaction controller 13 notifies the application, which is the problem solving means and which realizes the guide system, start of the task. In this case, the application, which is the problem solving means, follows the notification and requires the interaction controller 13 to acquire initial searching conditions for the purpose of searching the database, that is, "DATE OF ARRIVAL", "DATE OF DEPARTURE", "NUMBER OF TRAVELERS" and "BUDGET".

Figure 12:
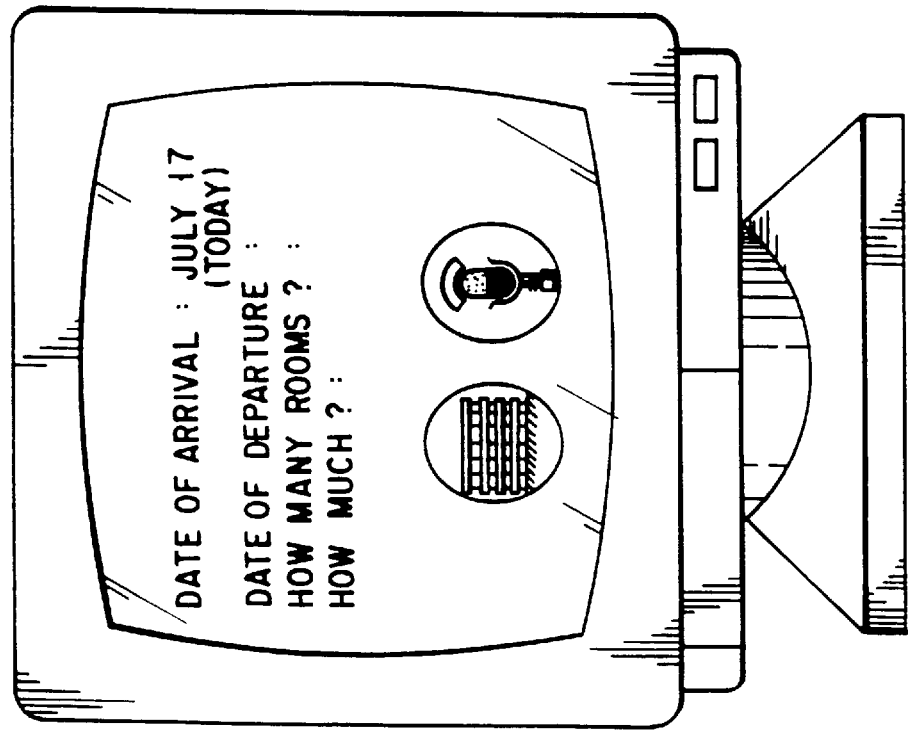
FIG. 12 shows an example of display of media allocation "VARIABLE DISPLAY VOICE INPUT AND OUTPUT"

To meet the requirement, the interaction controller 13 again requires the media allocation controller 12 to determine appropriate media allocation. In accordance with the reply, the interaction controller 13 sets media allocation "VARIABLE DISPLAY SPEECH INPUT AND OUTPUT" and performs interaction as described in Scene 3 (S2 to S7) of the scenario by means of speech while displaying the state of the searching condition which is being input as displayed on the screen shown in FIG. 12. As a result, the interaction controller 13 satisfies the requirement from the application, which is the problem solving means.

At this time, the plan memory 134 of the interaction planner 131 is in a state shown in TABLE 9.

TABLE 9

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [p11, p12] | |
| p03 | START SESSION | SUCCESS | [p31, p32] | |
| p04 | TASK EXECUTION | PROCESSING | [p41, p42, p43, p44] | |
| p05 | END SESSION | UNPROCESSED | | WAITING |
| p11 | MA SELECTION (WAITING) | SUCCESS | [p111, p112] | MA1 = WAITING |
| p12 | DETECTION WAITING | SUCCESS | [ ] | |
| p111 | MA INQUIRE (WAITING, MA1) | SUCCESS | [ ] | MA2 = HUMAN |
| p112 | MA SETTING | SUCCESS | [ ] | |
| p21 | NA INQUIRE (WAITING, MA2) | SUCCESS | [ ] | MA2 = HUMAN |
| p22 | MA SETTING (HUMAN) | SUCCESS | [ ] | |
| p31 | START REQUEST (U →S) | SUCCESS | [ ] | |
| p32 | START CONFIRMATION (S→ U) | SUCCESS | [ ] | |
| p41 | INITIAL CONDITION INPUT | PROCESSING | [p411, p412, p413] | |
| p42 | SEARCH | UNPROCESSED | | |
| p43 | CANDIDATE DETERMINATION | UNPROCESSED | | |
| p44 | CANDIDATE CONFIRMATION | UNPROCESSED | | |
| p411 | INPUT REQUEST (A →D | SUCCESS | [ ] | |

TABLE 9-continued

| NODE ID | TARGET | STATE | SUB-NODE ID LIST | RESULT |
|---|---|---|---|---|
| p412 | ([ARRIVAL, DEPARTURE, ROOMS, BUDGET]) MA SELECTION (INPUT REQUEST, ([ARRIVAL, DEPARTURE, ROOMS, BUDGET]), MA3) | SUCCESS | [p4111, p4112] | |
| p413 | INPUT PROCEDURE ([ARRIVAL, DEPARTURE, ROOMS, BUDGET]) | PROCESSING | | |
| p4111 | MA INQUIRE (INPUT REQUEST, ([ARRIVAL, DEPARTURE, ROOMS, BUDGET]), MA3) | SUCCESS | | MA1 = VARIABLE DISPLAY SPEECH INPUT/OUTPUT |
| p4112 | MA SET (VARIABLE DISPLAY SPEECH INPUT/OUTPUT) | SUCCESS | SUCCESS | |

As a result of the interaction performed as described above, the initial searching conditions for retrieving the database can be obtained. Thus, the problem solving means (the background application) performs the retrieval process. After the retrieval has been completed, the problem solving means requires the interaction controller 13 to output a result of the retrieval.

At this time, the problem solving mechanism 15, as well as the requirement for the output, notifies that output of the outline of the result of the retrieval, that is, the number of the results of the retrieval and database elements for each case, that is, "NAME", "READING OF THE NAME", "ADDRESS", "SCALE", "TYPES OF ROOMS AND CHARGES OF RESPECTIVE ROOMS", "CHARACTERISTICS", "PHOTOGRAPH OF THE HOTEL", "MAP", "ROUTE TO THE HOTEL AND TIME TAKEN TO ARRIVE THE HOTEL", "NEAREST STATION" and "SCENIC SPOTS IN THE VICINITY" to the output media processor 143 of the output section 14 of the multimodal interaction apparatus 10.

At this time, the plan memory 134 of the interaction planner 131 is in a state where the sub-target "p42" shown in TABLE 10 has been succeeded.

TABLE 10

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [P21, P22] | |
| p03 | START SESSION | SUCCESS | [P31, P32] | |
| p04 | TASK EXECUTION | PROCESSING | [P41, P42, P43, P44] | |
| p05 | END SESSION | UNPROCESSED OMITTED | | |
| p41 | INITIAL CONDITION INPUT | SUCCESS | [p411, p412, p413] | |
| p42 | SEARCH | SUCCESS | [ ] | |
| p43 | CANDIDATE DETERMINATION | PROCESSING | [P431] | |
| p44 | CANDIDATE CONFIRMATION | UNPROCESSED OMITTED | | |
| p431 | SELECTION REQUEST | PROCESSING | [p4311, p43121, p4313] | |
| p4311 | MA SELECTION (SELECTION ITEM DISPLAY) | PROCESSING | [p43111, p43112] | |
| p4312 | TASK EXECUTION PRESENTATION | UNPROCESSED | | |
| p4313 | END SESSION | UNPROCESSED | | |
| p43111 | MA SELECTION | PROCESSING | [ ] | |
| p43112 | START SESSION | UNPROCESSED | | |

To satisfy the next target "p43", which is "CANDIDATE DETERMINATION", the interaction planner 131 retrieves the interaction rule and intends to initially apply "r07". However, the process fails because the applicable conditions are not met.

Thus, the interaction planner 131 retrieves other interaction rules. Then, the interaction planner 131 selects "r08" so that "SELECTION REQUIREMENT, which is sub-target "p431" is developed. This sub-target is, by interaction rule "r10", developed to sub-target series "p4311", "p4312" and "p4313".

Among the sub-target series, sub-target "p4311" is further developed so that the plan memory 134 is brought to a state shown in TABLE 10. Then, the media allocation controller 12 is called in accordance with interaction rule "r12". Although the media allocation controller 12 performs a process similar to that described above, next media allocation selection node "m3", which satisfies the conditions, is selected due to the retrieval of the next media allocation selection table 122 because only three results of the retrieval are provided.

As a result, "TOUCH PANEL DISPLAY SELECTION-ANNOUNCEMENT OF ELEMENT NAMES" is selected as the input and output media for selecting a candidate from the results of the retrieval so that the interaction controller 13 executes the selected media allocation.

Therefore, the output media processor 143 selects, from data supplied from the problem solving mechanism 15, and sets a touch panel in which "NAME", "ADDRESS", "PHOTOGRAPH OF THE HOTEL", "SCALE" and "SCENIC SPOTS IN THE VICINITY" of each of the three hotels are disposed. Moreover, as Scene 4A of the scenario, the name of each hotel is announced (S8) and a voice message for urging selection is output from the speaker.

The conventional interaction apparatus is arranged to output the same form outputs regardless of the number of outputs. For example, tens to hundreds of results of retrieval have been announced or only several results of retrieval have been displayed in the form of a table. Therefore, the input and output methods have been sometimes difficult for a user to understand and operate the apparatus.

For example, the conventional interaction apparatus has read names of all hotels similarly to the interaction (S8) of Scene 4A though results of retrieval of the database are too numerous to be read.

The multimodal interaction apparatus according to the present invention is able to solve the foregoing problem by employing the mechanism for dynamically setting the input and output media to be adaptable to the situation in addition to the interaction control mechanism based on the conventional hierarchy plan generating method or the state transition graph method. Therefore, the multimodal interaction apparatus according to the present invention has the structure such that the interaction controller 13 inquires of the media allocation controller 12 an appropriate media allocation at the point of time; the media allocation is dynamically set to correspond to the contents of the reply; and, for example, table presentation is selected if many articles are required to be presented to a user. Thus, optimum presentation of results of retrieval adaptable to the situation can be performed.

Figure 13:
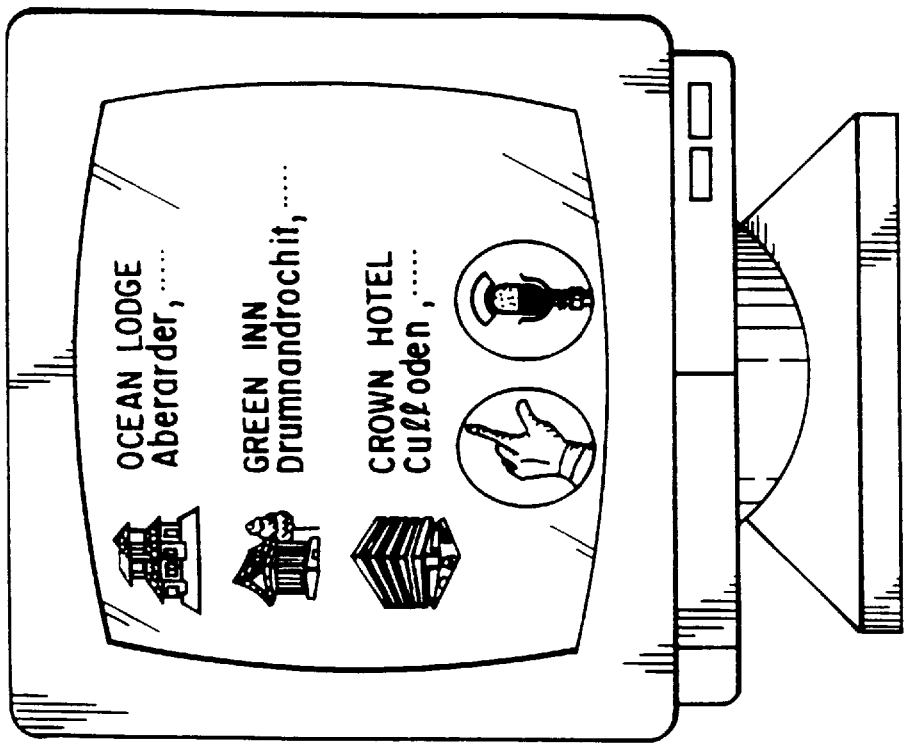
FIG. 13 shows an example of display of media allocation "TOUCH PANEL DISPLAY SELECTION, ELEMENT NAME VOICE READING"

In the interaction in Scene 4A for example, the number of the hotels to be presented due to the result of the retrieval is three. To urge the user to select from the three hotels, which are the results of the retrieval, the media allocation generator 121 selects node "m04" of the next media allocation selection table 122. As a result, the input and output media allocation is performed such that a relatively large display area is given to each hotel, as shown in FIG. 13.

Figure 14:
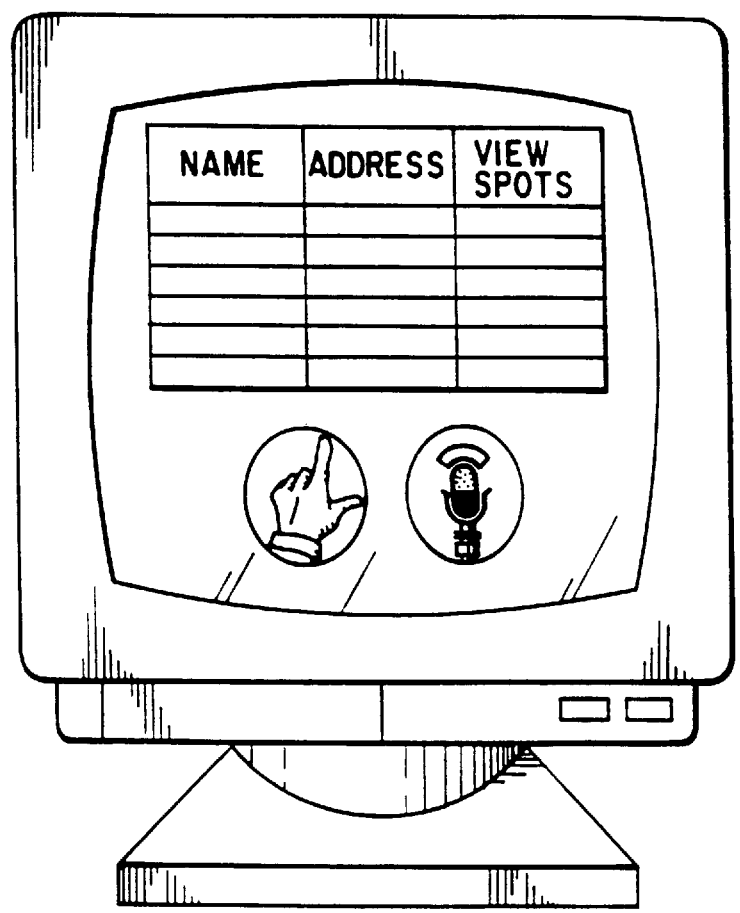
FIG. 14 shows an example of display of media allocation "TABLE TYPE TOUCH PANEL DISPLAY SELECTION, NUMBER OF RESULTS OF RETRIEVAL VOICE OUTPUT".

If a large number of results of retrieval are, even in a similar case, to be provided, for example, 10, the next media allocation selection node to be selected by the media allocation generator 121 is "m05". As a result, a table type display output as shown in FIG. 14 is allocated so that input and output media allocation is performed in such a manner that the hotel names are not announced but the number of results of retrieval is announced to protect a user from stress.

Thus, the multimodal interaction apparatus according to the present invention is able to set the combination of output means, which can easily be recognized and understood by a user, to be suitable to the quality and quantity of information required to be output by the application (the problem solving means).

If the number of results of retrieval of the database is excessively large as in Scene 4B, even the table type output requires the user to bear a heavy load when the user selects the result. Therefore, presentation of the results of retrieval to meet the requirement from the application (the problem solving means) is not suitable.

A process to be performed in the foregoing case will now be described. An assumption is performed that the problem solving means has performed the retrieval process, similarly to the case of Scene 4A, and the interaction has proceeded in the plan memory 134 of the interaction planner 131 to sub-target "p43111" shown in TABLE 10.

In this case, since the elements of results of the retrieval, the number of which is 534, are too many, the next media allocation selection table shown in TABLE 6 is not provided with the next media allocation selection node 122 which meets the condition. Therefore, sub-target "p43111" for calling the media allocation controller 12, that is, "MA INQUIRY" fails. Since "p43111" has failed, the interaction planner 131 performs a backtracking process similar to that performed by a "Prolog" interpreter, which is one of many known computer languages.

That is, the operation backtracks to "MA SELECTION (PRESENTATION OF CHOICES)" of "p4311", which is an upper goal for "p43111" so that retrial is performed to detect whether an interaction rule or interaction primitive adaptable to "p4311" exists. Since no applicable interaction rule nor interaction primitive exist except the failure interaction rule "r12", "p4311" fails and the operation backtracks to "SELECTION REQUIREMENT" of "p431", which is the upper goal for "p4311".

Since "p431" also fails, the operation backtracks to "CANDIDATE DETERMINATION" of "p43" so that an applicable interaction rule or interaction primitive is searched for performing retrial of the goal. As a result, interaction rule "r09" shown in TABLE 4 is applied so that sub-target series "p4301", "p4302" and "p4303" is developed as shown in TABLE 11.

TABLE 11

| NODE ID | TARGET | STATE | SUB-NODE ID LIST | RESULT |
| --- | --- | --- | --- | --- |
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [p21, p22] | |
| p03 | START SESSION | SUCCESS | [p31, p32] | |
| p04 | TASK EXECUTION | PROCESSING | [p41, p42, p43, p44] | |
| p05 | END SESSION | UNPROCESSED | | |
| | | OMITTED | | |
| p41 | INITIAL CONDITION INPUT | SUCCESS | [p4311, p4312, p4313] | |
| p42 | SEARCH | SUCCESS | [ ] | |
| p43 | CANDIDATE DETERMINATION | FAILURE | [P431] | |
| p44 | CANDIDATE CONFIRMATION | UNPROCESSED | | |
| | | OMITTED | | |
| p431 | SELECTION REQUEST | FAILURE | [p4311, p4312, p4313] | |
| p4311 | MA SELECTION (SELECTION ITEM PRESENTATION) | FAILURE | [p43111, p43112] | |
| p4312 | SELECTION ITEM PRESENTATION | UNPROCESSED | | |
| p4313 | USER SELECTION | UNPROCESSED | | |
| p43111 | MA INQUIRE (SELECTION ITEM PRESENTATION, MA1) | FAILURE | [ ] | |
| p43112 | MA SETTING (MA1) | UNPROCESSED | | |
| p43 | CANDIDATE DETERMINATION | RE-EXECUTION | [p4301, p4302, p4303] | |
| p4301 | SEARCH CONDITION LIMIT SEARCH | PROCESSING | [p43011, p43012, p43013] | |
| p4302 | CANDIDATE | UNPROCESSED | | |
| p4303 | DETERMINATION | UNPROCESSED | | |
| p43011 | NONINPUT VARIABLE INQUIRE (D→A, NONINPUT VARIABLE LIST) | SUCCESS | [ ] | NONINPUT VARIABLE LIST = [VIEWING SPOT, ROOM STYLE, HOTEL STYLE] |
| p43012 | MEMBER(INPUT VARIABLE, [VIEWING SPOT, ROOM STYLE, HOTEL STYLE]) | SUCCESS | | INPUT VARIABLE = VIEWING SPOT |
| p43013 | ADDITIONAL CONDITION INPUT (VIEWING SPOT, [SEARCH CONDITION LIMIT]) | PROCESSING | [p4301311, p4301312] | |
| p430131 | MA SELECTION (ADDITIONAL CONDITION INPUT (VIEWING SPOT, [SEARCH CONDITION LIMIT]) | SUCCESS | [p43013111, p4301312] | |
| p430132 | INPUT OBJECT PRESENTATION (D→U, [ADDITIONAL CONDITION INPUT, SEARCH CONDITION LIMIT]) | SUCCESS | | |
| p430133 | INPUT PROCEDURE (VIEWING SPOT) | PROCESSING | [p4301331] | |

TABLE 11-continued

| NODE ID | TARGET | STATE | SUB-NODE ID LIST | RESULT |
|---|---|---|---|---|
| p4301331 | VARIABLE INPUT (VIEWING SPOT) | PROCESSING | [ ] | |
| | | | OMITTED | |

When the interaction planner 131 executes "NARROWING DOWN RETRIEVAL CONDITION" of "p4301", it applies interaction rule "r14" so that sub-target series "p43011", "p43012" and "p43013" is generated.

During a process in which "NON-INPUT VARIABLE INQUIRY" of sub-target "p43011", which is the interaction primitive, is executed, the interaction controller 13 inquires of the problem solving mechanism 15 the variable which has not been employed to retrieve the hotels. To meet the requirement, the problem solving mechanism 15 reports non-input variable list "PREDETERMINED TOURIST RESORT", "STYLE OF ROOM" and "STYLE OF THE HOTEL". When "member (input variable "PREDETERMINED TOURIST RESORT", "STYLE OF ROOM" and "STYLE OF THE HOTEL") of next sub-target "p43012" is executed, the variable "PREDETERMINED TOURIST RESORT" is fetched from the non-input variable list.

To cause the user to input the variable as the additional condition, interaction rule "r17" is applied to "INPUT OF ADDITIONAL CONDITION" of the next sub-target "p43013" so that sub-target series "p430131", "p430132" and "p430133" is generated.

When the sub-target series is executed, interaction as is performed in Scene 4 of the scenario is held so that the multimodal interaction apparatus according to the present invention is recovered from fail in the media allocation and enabled to continue the interaction with the user.

TABLE 11 shows a state of the plan memory 134 when Scene 4B (announcement from the system (S10)) of the scenario has been completed.

An operation for coping with a case where the system has failed in performing the voice recognition process because the contents of the voice input obtained from the user are not correct will now be described.

In a case where the system has failed in performing the voice recognition process because the user does not know the correct pronunciation of the name of the tourist resort in response to the requirement from the system to perform voice input in Scene 4B, the conventional multimodal interaction apparatus having no means for dynamically allocating the input and output media encounters a difficulty in recovering communication with the user.

Even in the foregoing case, the multimodal interaction apparatus according to the present invention has the structure such that the interaction planner 131 considers the failure in the interaction with the user as a failure occurring when the interaction rule is executed; and the interaction planner 131 searches another interaction rule capable of satisfying the failure sub-target and performs retrial if an applicable interaction rule exists.

Since a failure takes place in the voice input which is an input medium that is advantageous in view of serving as a human-machine interface but disadvantageous in view of the input process, in particular, reliable process of inputting place name, input medium "manual character recognition" is selected and retrial is performed. Thus, continuation of the interaction with the user succeeds.

The control is performed as follows:

As described above, when the announcement from the system has been made in the final portion of Scene 4B of the scenario, that is, when announcement "Where are you planning to visit?" has been made, the plan memory 134 is in a state as shown in TABLE 11.

It is assumed that the user intending to input "Loch Ness" has read the same as "lák ness or lók ness". If "lák ness or lók ness" is not the subject word for the voice recognition in the Scotland hotel guide system, the voice recognition process fails.

Therefore, sub-target "p4301331" fails and retrial of the "INPUT PROCESS" of the parent target "p430133" of the sub-target "p4301331" is performed with another applicable interaction rule "r19". The interaction rule "r19" is an interaction rule for causing input to be again performed with the same media allocation. The foregoing interaction rule causes "p4301331" to be developed into sub-target series "p43013301" and "p43013302" as shown in TABLE 12. Thus, interaction in S15 and U9 is performed between the apparatus and the user during execution of the foregoing process.

TABLE 12

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [p21, p22] | |
| p03 | START SESSION | SUCCESS | [p31, p32] | |
| p04 | TASK EXECUTION | PROCESSING | [p41, p42, p43, p44) | |
| p05 | END SESSION | UNPROCESSED | | |
| | | | OMITTED | |
| p41 | INITIAL CONDITION INPUT | SUCCESS | [p411, p412, p413] | |
| p42 | SEARCH | SUCCESS | [ ] | |

TABLE 12-continued

| NODE ID | TARGET | STATE | SUB-NODE ID LIST | RESULT |
|---|---|---|---|---|
| p43 | CANDIDATE DETERMINATION | FAILURE | [P431] | |
| p44 | CANDIDATE CONFIRMATION | UNPROCESSED | | |
| | | OMITTED | | |
| p431 | SELECTION REQUEST | FAILURE | [p4311, p4312, p4313] | |
| p4311 | MA SELECTION (SELECTION ITEM PRESENTATION) | FAILURE | [p43111, p43112] | |
| p4312 | SELECTION ITEM PRESENTATION | UNPROCESSED | | |
| p4313 | USER SELECTION | UNPROCESSED | | |
| p43111 | MA INQUIRE (SELECTION ITEM PRESENTATION, MA1) | FAILURE | [ ] | |
| p43112 | MA SETTING (MA1) | UNPROCESSED | | |
| p43 | CANDIDATE DETERMINATION | RE-EXECUTION | [p4301, p4302, p4303] | |
| p4301 | SEARCH CONDITION LIMIT | PROCESSING | [p43011, p43012, p43013] | |
| p4302 | SEARCH | UNPROCESSED | | |
| p4303 | CANDIDATE DETERMINATION | UNPROCESSED | | |
| p43011 | NONINPUT VARIABLE INQUIRE (D→A, NONINPUT VARIABLE LIST) | SUCCESS | [ ] | NONINPUT VARIABLE LIST = [VIEWING SPOT, ROOM STYLE, HOTEL STYLE] |
| p43012 | MEMBER(INPUT VARIABLE, [VIEWING SPOT, ROOM STYLE, HOTEL STYLE]) | SUCCESS | | INPUT VARIABLE = VIEWING SPOT |
| p43013 | ADDITIONAL CONDITION INPUT(VIEWING SPOT, [SEARCH CONDITION LIMIT]) | PROCESSING | [p4301311, p4301312] | |
| p430131 | MA SELECTION (ADDITIONAL CONDITION INPUT (VIEWING SPOT, [SEARCH CONDITION LIMIT]) | SUCCESS | [p43013111, p4301312] | |
| p430132 | INPUT OBJECT DISPLAY (D→U, [ADDITIONAL CONDITION INPUT, SEARCH CONDITION LIMIT]) | SUCCESS | | |
| p430133 | INPUT PROCEDURE (VIEWING SPOT) | FAILURE | [p4301331] | |
| p4301331 | VARIABLE INPUT (VIEWING SPOT) | FAILURE | [ ] | |
| | | OMITTED | | |
| p430133 | INPUT PROCEDURE (VIEWING SPOT) | FAILURE | [p43013301, p43013302, p43013303] | |
| p43013301 | RE-INPUT REQUEST | FAILURE | [ ] | |
| p43013302 | VARIABLE INPUT (VIEWING SPOT) | FAILURE | [ ] | |
| p430133 | INPUT | RE- | [p43013311, p4301331 |

TABLE 12-continued

| NODE ID | TARGET | STATE | SUB-NODE ID LIST | RESULT |
|---|---|---|---|---|
| | PROCEDURE (VIEWING SPOT) | EXECUTION | 2, p43013313] | |
| p43013311 | MA SELECTION (INPUT FAILURE (VIEWING SPOT]) RE-INPUT | PROCESSING | [p430133111,p430133112] | |
| p43013312 | REQUEST VARIABLE INPUT | UNPROCESSED | | |
| p43013313 | (VIEWING SPOT) | UNPROCESSED | | |
| p430133111 | MA SELECTION (INPUT FAILURE (VIEWING SPOT), MA1) MA SETTING | PROCESSING | [ ] | |
| p430133113 | (MA1) | UNPROCESSED | | |

That is, the following interaction is performed:

Apparatus: "I beg your pardon. Please speak again".

User: "Loch Ness (lák ness or lóness)!"

Due to a similar reason, the voice recognition process fails and sub-target "p430133" again fails.

Rule "r20" applied next is an interaction rule for again allocating the media by using the failure in the input as the key and causing input to be performed again. The foregoing interaction rule causes "p430133" to be tried again so as to be developed into sub-target series "p43013311", "p43013312" and "p43013313".

"MA SELECTION (INPUT FAILURE (PREDETERMINED TOURIST RESORT))" of sub-target "p4301311" is further developed into sub-target series "p430133111" and "p430133112" in accordance with interaction rule "r12".

Since "MA INQUIRY" of sub-target "p430133111" is the interaction primitive, the media allocation controller 12 is called in accordance with the contents of the interaction primitive table 133.

As described above, the media allocation controller 12 makes a reference to the next media allocation selection table 122 shown in TABLE 6 so that next media allocation selection node "m6" is selected in this case. The next media allocation selection node is selection of media allocation for changing only the input mode of the current media allocation from spoken language mode to pen character string input mode. By continuing the interaction of the variable input in accordance with the media allocation, the interaction can be allowed to proceed to the portion following S12 in Scene 4C. Moreover, the operation can be restored to the interaction with which a task for selecting a hotel is continued. That is, Apparatus: "I do not recognize. Please spell the name of your desired destination."

When the user has written "Loch Ness" on the screen with the pen, the apparatus recognizes the characters so that the apparatus recognizes that "lák ness or lóness" is Loch Ness ("láx ness or lóx ness"). As a result, the following interaction succeeds:

Apparatus: "Loch Ness ("láx ness or lóx ness"). Please wait for a minute while a search is conducted".

Thus, the multimodal interaction apparatus according to the present invention has the structure such that the input and output means are changed if interaction with a user fails to again try the interaction by other input and output means. Therefore, the failure is recovered and the interaction with the user can be continued.

If an apparatus for capturing external noise is added to the multimodal interaction apparatus according to the present invention in order to cope with excessively loud external noise and an input mode element is realized which is able to determine the appropriateness of the voice input and output in accordance with the input from the added apparatus, the media allocation generator 121 performs the media allocation such that possibility of the voice input and output and the media allocation described in the limitation portion of the mode-media correspondence table shown in TABLE 7 are not selected.

As a result, if noise becomes too loud when, for example, the media allocation for performing voice input has been selected and the voice input from the user has been received, call of the media allocation controller is generated due to a failure in the voice recognition similarly to the foregoing case and a next media allocation is newly performed in the media allocation controller. However, the media allocation for use in voice input and output is not selected in the foregoing selection process.

Thus, the multimodal interaction apparatus having the foregoing structure comprising the control for changing the input and output media to be adaptable to change in the external environmental elements causes optimum input and output media to be selected and employed to be adaptable to the external environmental elements. Therefore, the interaction with the user can be continued.

It is assumed that the user requires the directions to, and time required to arrive at the desired hotel as is performed in Scene 5 after Scene 4A or 4C has been performed. That is, in a case where the user requires an output by a medium different from the medium determined and allocated by the multimodal interaction apparatus 10, the conventional multimodal interaction apparatus having no means for dynamically performing input and output media allocation cannot meet the requirement from the user. However, the multimodal interaction apparatus according to the present invention is able to meet the requirement of the foregoing type.

Even if the foregoing requirement has arisen, the multimodal interaction apparatus according to the present invention is able to separate control of the interaction and allocation of the input and output media from each other so that the media allocation controller 12 is able to select the media allocation individually from the flow of the interaction. As a result, the multimodal interaction apparatus according to the present invention is able to meet the user's requirement.

When a requirement of the type described in T6 of Scene 5 has been made, the plan memory 134 of the interaction planner 131 is in the state where it processes the "USER SELECTION" of sub-target "p4313" and waits for the input from a user. Since the input from the user is not selection of a candidate but the input is to change the media allocation and to require an output to be performed again, sub-target "p4313" fails.

In accordance with the selection, the interaction planner 131 changes the output media allocation when choices of hotels are displayed. The interaction planner 131 displays "NAMES", "PHOTOGRAPHS" and "MAPS" of the three hotels on the display and sets a touch panel button. Moreover, the interaction planner 131 makes an announce-

TABLE 13

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [p21, p22] | |
| p03 | START SESSION | SUCCESS | [p31, p32] | |
| p04 | TASK EXECUTION | PROCESSING | [p41, p42, p43, p44] | |
| p05 | END SESSION | UNPROCESSED OMITTED | | |
| p41 | INITIAL CONDITION INPUT | SUCCESS | [p4311, p4312, p4313] | |
| p42 | SEARCH | SUCCESS | [ ] | |
| p43 | CANDIDATE DETERMINATION | PROCESSING | [P431] | |
| p44 | CANDIDATE CONFIRMATION | UNPROCESSED OMITTED | | |
| p431 | SELECTION REQUEST | PROCESSING | [p4311, p4312, p4313] | |
| p4311 | MA SELECTION (SELECTION ITEM PRESENTATION) | SUCCESS | [p43111, p43112] | |
| p4312 | SELECTION ITEM | SUCCESS | [ ] | |
| p4313 | PRESENTATION USER SELECTION | PROCESSING OMITTED | [ ] | |

As a result of the failure, a backtracking process is generated and "SELECTION REQUIREMENT" of "p431", which is a parent target of "p4313" fails and interaction rule "r15" shown in TABLE 4 is again tried. During the execution of the interaction rule, the interaction planner 131 requests the media allocation controller 12 to select an appropriate media allocation under condition of "USER REQUEST (OUTPUT (ROUTE AND TIME REQUIRED TO ARRIVE THE HOTEL))". To meet the request, the media allocation controller 12 selects media allocation "NAME, PHOTOGRAPH, MAP TOUCH PANEL DISPLAY SELECTION-ROUTE VOICE READING". Then, the media allocation controller 12 supplies the selected media allocation to the interaction planner 131.

ment as is performed in S9 in Scene 5 such that "AN HOUR AND A HALF IS TAKEN TO ARRIVE OCEAN LODGE BY BUS; ABOUT 30 MINUTES BY TRAIN AND ABOUT 30 MINUTES BY BUS ARE TAKEN TO ARRIVE GREEN INN; AND ABOUT 30 MINUTES BY BUS AND ABOUT 30 MINUTES WALK ARE TAKEN TO ARRIVE CROWN HOTEL". Thus, information is supplied to the user and again requires the user to select candidate of the hotel. At this time, the plan memory 134 is in a state as shown in TABLE 14.

TABLE 14

| NODE ID | TARGET | STATE | SUB-NODE ID LIST | RESULT |
|---|---|---|---|---|
| p0 | INTERACTION SESSION | PROCESSING | [p01, p02, p03, p04, p05] | |
| p01 | USER DETECTION | SUCCESS | [p11, p12] | |
| p02 | MA SELECTION (INITIAL) | SUCCESS | [p21, p22] | |
| p03 | START SESSION | SUCCESS | [p31, p32] | |
| p04 | TASK EXECUTION | PROCESSING | [p41, p42, p43, p44] | |
| p05 | END SESSION | UNPROCESSED OMITTED | | |
| p41 | INITIAL CONDITION INPUT | SUCCESS | [p4311, p4312, p4313] | |
| p42 | SEARCH | SUCCESS | [ ] | |
| p43 | CANDIDATE DETERMINATION | PROCESSING | [p431] | |
| p44 | CANDIDATE CONFIRMATION | UNPROCESSED OMITTED | | |
| p431 | SELECTION REQUEST | FAILURE | [p4311, p4312, p4313] | |
| p4311 | MA SELECTION (SELECTION ITEM PRESENTATION) | FAILURE | [p43111, p43112] | |
| p4312 | SELECTION ITEM | FAILURE | [ ] | |
| p4313 | PRESENTATION USER SELECTION | FAILURE | [ ] | |

TABLE 14-continued

| NODE ID | TARGET | STATE | SUB-NODE ID LIST | RESULT |
|---|---|---|---|---|
| | | OMITTED | | |
| p431 | SELECTION REQUEST | RE-EXECUTION | [P43101,P43102,P43103] | |
| P43101 | NA SELECTION (USER REQUEST (OUTPUT ([ROUTE, TIME])) | SUCCESS | [P431011, P431012] | |
| P43102 | SELECTION ITEM PRESENTATION | PROCESSING | [ ] | |
| P43013 | USER SELECTION | UNPROCESSED | | |
| P431011 | MA INQUIRE (USER REQUEST (OUTPUT ([ROUTE, TIME])) | SUCCESS | [ ] | MA1 = NAME, PHOTO, MAP TOUCH PANEL SPLAY, ROUTE SPEECH |
| P431012 | MA SETTING (MA1) | SUCCESS | | |

As a result, the multimodal interaction apparatus according to the present invention is able to employ input and output modes required by a user and the interaction can be continued to correspond to an interpretation made by the user in such a manner that the user takes the initiative. Thus, an interface which can be operated more easily by each user can be provided.

The present invention is not limited to the foregoing embodiments but various modifications are permitted. Although the input section 11 according to the foregoing embodiment has the three modules; the input device processor 111, the input mode processor 112 and the input media processor 113, and the output section 14 has the three modules; the output device processor 141, the output mode processor 142 and the output media processor 143, the structures of the input and output processors for realizing the multimodal interaction apparatus according to the present invention are not limited to the foregoing structures. A variety of modifications may be permitted.

Although the foregoing embodiment has the structure such that the input section and the output section are individually disposed, the input section and the output section may be formed into an integrated input and output section. A structure of the foregoing type is within the scope of the present invention.

Although the foregoing embodiment has the structure such that the media allocation controller is provided individually from the interaction controller and the problem solving means; and the problem solving means is provided individually from the input section, the output section, the interaction controller and the like, the method of constituting the units for realizing the multimodal interaction apparatus according to the present invention is not limited to this. For example, interaction controller having a media allocation determining function enables the multimodal interaction apparatus according to the present invention to be realized without the media allocation controller. Another structure may be employed in which the problem solving means has the function of the interaction controller, that of the media allocation controller, that of the input section and that of the output section. The foregoing structure is within the scope of the present invention.

As described above, the multimodal interaction apparatus according to the present invention can be realized by a variety of structures consisting of elements. Therefore, the present invention is not limited to the foregoing element structure.

Although the foregoing embodiment has the structure such that the media allocation controller 12 performs the control such that the next media allocation selection table 122 for determining media allocation at a certain point of time and next media allocation in accordance with the situation of the foregoing point of time, the media allocation determining method for realizing the multimodal interaction apparatus according to the present invention is not limited to this. For example, a media allocation determining method based on, for example, a state transition model may be employed to realize the present invention. By adding, for example, preference slot or information to the next media allocation selection table 122, selection of further precise media allocation can be performed.

Although the foregoing embodiment has the structure such that the media allocation generator 121 determines media allocation by using history information for the media allocation for only one time, that is, only current media allocation information, media allocation history information can be used when the media allocation is determined by describing the state of previous media allocation in the condition portion of the next media allocation selection table 122.

Although the foregoing embodiment has the structure such that the interaction control based on the hierarchy plan generating method is employed, the method of controlling the interaction for the multimodal interaction apparatus according to the present invention is not limited to this. For example, an interaction control method employing, for example, a state transition model, may be employed in the present invention.

Although the input methods, that can be used by a user, are displayed on the display unit to cause the same to be recognized by the user, the input media presentation method to be adaptable to the present invention is not limited to this. For example, the presentation according to the present invention may be performed on another output apparatus such that the display is performed on another display unit.

Although the foregoing embodiment has the structure such that only the input methods, that can be used by a user, are displayed on the display unit to cause the methods to be recognized by the user, the presentation to the user is not limited to the input method. Also the output methods may be displayed similarly. If the multimodal interaction apparatus according to the present invention responds to a user, who is hard of hearing by means of voice, the user is able to recognize this. Therefore, the user is permitted to require the media allocation to be changed.

A structure may be employed in which a specific user mode storage section is provided for the media allocation controller to previously store media, which can be used by the user or media which cannot be used by the user. Thus, an optimum media allocation can be set for each user when the user of hard of hearing without a necessity for the user to require the media allocation at each operation.

Moreover, personal conditions of users relating to the media allocation are recorded on an interchangeable medium, for example, an IC card and an apparatus capable of reading, for example, the IC card is provided for the multimodal interaction apparatus according to the present invention. In this case, when the user inserts the IC card into the reading apparatus to cause the reading apparatus to read the IC card so as to cause the specific user model storage section to store the read information. Thus, an apparatus for general public is able to cope with each operation while setting individual conditions for the users. As a result, an apparatus capable of initially setting media allocation suitable for the conditions of each user can be provided. Since optimum media allocation for each user can be performed at the initial stage of use of the apparatus, the apparatus can smoothly be operated without an operation for requiring the change of the medium. Thus, the present invention contributes to improvement in the service.

A system of a type which is used by specific users may be structured such that specific user model storage is performed on a nonvolatile memory in such a manner that the contents can be updated by the user or a learning function is provided to cause the stored contents to reflect a result of learning. Thus, an interface, which can easily be used by a user as the apparatus is used frequently, can be provided.

The media allocation controller may be provided with a mechanical learning mechanism, such as ID3 or a neuron device, to be capable of automatically updating the contents in the specific user mode storage section in accordance with results of learning. Thus, an interface does not require the user to update the user model and can easily be used by the user by only increasing the number of times of using the apparatus.

Although the foregoing embodiment has the structure such that the specific user mode storage section stores media, which can be used for specific users, and media which cannot be used by the specific users, the contents to be stored by the specific user mode storage section are not limited to the foregoing contents. For example, media which are selected by the specific users are similarly stored in the specific user mode storage section so that an interface which is further preferred for each user is provided. The foregoing method is within the scope of the present invention.

Another structure may be employed in which the output media for notifying the input method, which can be used by the user, is determined by the media allocation controller and the determined output media allocation is employed to output the input method. The foregoing method is within the scope of the present invention.

The foregoing embodiment has been described for the case where a failure occurring in voice recognition due to incorrect reading performed by a user is solved. If interaction encounters a problem due to change in the situation of the media which is being used, for example, if the voice input is inhibited due to environmental noise, a media monitoring function for monitoring the states of the input and output media may be included in the media switching section to monitor whether the media allocation, which has been set by the media switching section at a certain point of time and which has been intended to be used, has been used without any problem and whether the communication between the user and the interaction apparatus has been established.

Thus, a process for solving the problem can be performed. For example, by always monitoring, for example, the level of the surrounding noise in a case where a voice input from a user is received or a voice output to the user is performed, problems occurring due to, for example, generation of intense noise inhibiting the communication between the user and the interaction apparatus are reported to the interaction controller. Thus, for example, voice input and output are interpreted and screen display and input by using the keyboard are performed. As described above, if a problem occurs, the media can appropriately be changed or a process for turning on a sub-interaction, such as an inquiry, can be turned on for the purpose of solving the problem. As a result, an interaction apparatus capable of coping with change in the environment or the like can be realized.

As described above, the present invention has the structure such that appropriate input and output media are dynamically selected to be adaptable to the state of the interaction and input and output means, which can be used at the point of time. Therefore, an interface which can easily be used to correspond to the situation can be provided for a user. Moreover, the user is enabled to easily recognize the input means which can be used. Therefore, an interface which can further easily be used can be provided.

Moreover, combination of the output means, which can easily be used and easily be recognized, can be set to correspond to the quality and quantity of information required by the application to be output. By using input and output methods required by the user, an interface, which can easily be operated for each user, can be provided. Since input and output means preferred for the user can be used, an interface which can easily be operated for each user can be provided. Since input and output means, which are not preferred for the user, are avoided, an interface, which can easily be operated by each user, can be provided. Moreover, the input and output means are changed to restore a failure in the interaction with the user to enable the interaction to be continued. Consequently, the present invention enables a multiplicity of and significant practical advantages to be realized.

What is claimed is:

1. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an information output from said problem solving means to said output device, at least one of a selection of an information from said problem solving means and a combination of the selected information, said media allocation means including a media allocation slot for recording an input-output media allocation information which are selected at present, and when an instruction to change the input-output media allocation has been issued, a new media allocation is performed by using the input-output media allocation information recorded in said media allocation slot.

2. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation; and media allocation means for performing the input-output media allocation by interacting with the user, said input-output media allocation including
 (i) at least one of a selection of a corresponding information to be supplied from said input means to said problem solving means from corresponding information generated for each of the input media and a combination of the corresponding information generated from said problem solving means for each of the input media, and
 (ii) to obtain an information output from said problem solving means to said output device, at least one of a selection of an information from said problem solving means and a combination of the selected information, said media allocation means including a media allocation history slot for storing a series of input-output media allocation information which have been selected, when the input-output media allocation has been changed, selected input-output media allocation information is added to said media allocation history slot, and when an instruction to change the input-output media allocation has been issued, a new media allocation is performed by using the input-output media allocation information recorded in said media allocation slot.

3. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation;

interaction control means for changing the input-output media allocation in accordance with the result of the process performed by said problem solving means and controlling input and output to be performed by said input means and said output means; and media allocation means for performing the input-output media allocation by interacting with the user, said input-output media allocation
 (i) to obtain an information to be supplied to said input device from information input from the user, selecting a combination of said input means and a data input method, and
 (ii) to obtain an expression instructing the user from the output of said problem solving means, selecting a combination of said output means and a data output method, said interaction control means including means for monitoring an operating state of at least one of said input means and said output means to supply problem information indicating generation of a problem to said media allocation means when the problem inhibiting use of at least one of the input media allocation and the output media allocation which have been selected and used occurs, and said media allocation means including means for changing the input-output media allocation when the problem information is supplied to said media allocation means.

4. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation;

interaction control means for changing the input-output media allocation in accordance with the result of the process performed by said problem solving means and controlling input and output to be performed by said input means and said output means; and media allocation means for performing the input-output media allocation by interacting with the user, said input-output media allocation
 (i) to obtain an information to be supplied to said input device from information input from the user, selecting a combination of said input means and a data input method, and
 (ii) to obtain an expression instructing the user from the output of said problem solving means, selecting a combination of said output means and a data output method, said problem solving means including means for supplying an input request to said interaction control means when information required to solve a problem of the system is needed to be acquired from the user so as to urge the user to input a required information, and said media allocation means including means for performing new media allocation by using said required information when an instruction for performing a process for changing the input-output media allocation has been supplied.

5. A multimodal interaction apparatus for performing a predetermined process by interacting with a user and outputting a result of the process, said multimodal interaction apparatus comprising:

an input device, having plural input means for obtaining, information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation;

interaction control means for changing the input-output media allocation in accordance with the result of the process performed by said problem solving means and controlling input and output to be performed by said input means and said output means; and media allocation means for performing the input-output media allocation by interacting with the user, said input-output media allocation (i) to obtain an information to be supplied to said input device from information input from the user, selecting a combination of said input means and a data input method, and (ii) to obtain an expression instructing the user from the output of said problem solving means, selecting a combination of said output means and a data output method, said interaction control means including means for supplying an output request for requiring said problem solving means to output information required to constitute an output to the user in accordance with the input-output media allocation in which said output device have been set and requiring said problem solving means to output a required information, and said media allocation means including means for performing new media allocation by using said requested information when an instruction for performing a process for changing the input-output media allocation have been supplied.

6. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation;

interaction control means for changing the input-output media allocation in accordance with the result of the process performed by said problem solving means and controlling input and output to be performed by said input means and said output means; and media allocation means for performing the input-output media allocation by interacting with the user, said input-output media allocation (i) to obtain an information to be supplied to said input device from information input from the user, selecting a combination of said input means and a data input method, and (ii) to obtain an expression instructing the user from the output of said problem solving means, selecting a combination of said output means and a data output method, said media allocation means including a media allocation slot for recording an input-output media allocation information which are selected at present, and when an instruction to change the input-output media allocation has been issued, a new media allocation is performed by using the input-output media allocation information recorded in said media allocation slot.

7. A multimodal interaction apparatus for performing a predetermined process by interacting with a user and outputting a result of the process, said multimodal interaction apparatus comprising:

an input device, having plural input means, for obtaining information from the user, interpreting the information input from at least one input means selected from said plural input means in accordance with an input-output media allocation and generating corresponding information in accordance with a result of interpretation;

problem solving means for performing the predetermined process in accordance with the corresponding information and outputting a result of the process;

an output device, having plural output means, for outputting a result of the process output from said problem solving means from at least one output means selected from the plural output means in accordance with the input-output media allocation;

interaction control means for changing the input-output media allocation in accordance with the result of the process performed by said problem solving means and controlling input and output to be performed by said input means and said output means; and media allocation means for performing the input-output media allocation by interacting with the user, said input-output media allocation (i) to obtain an information to be supplied to said input device from information input from the user, selecting a combination of said input means and a data input method, and (ii) to obtain an expression instructing the user from the output of said problem solving means, selecting a combination of said output means and a data output method, said media allocation means including a media allocation history slot for storing a series of input-output media allocation information which have been selected, when the input-output media allocation has been changed, selected input-output media allocation information is added to said media allocation history slot, and when an instruction to change the input-output media allocation has been issued, a new media allocation is performed by using the input-output media allocation information recorded in said media allocation slot.

8. A multimodal interaction apparatus comprising:

problem solving means for subjecting an input to a calculation process to satisfy an object of the system and outputting a result of process;

an input device, having plural input means, for interpreting an information input from at least one input means selected from said plural input means in accordance with an input-output media allocation and supplying an information corresponding to a result of interpretation to said problem solving means;

an output device, having plural output means, for outputting a result of the process output from said problem solving means from at least one output means selected from the plural output means in accordance with the input-output media allocation;

interaction control means for changing the input-output media allocation in accordance with the result of the process output from said problem solving means and controlling input and output to be performed by said input means and said output means; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of said problem solving means, at least one of a selection of an information from said problem solving means and a combination of the selected information, and said media allocation means performing new media allocation when an instruction to change the input-output media allocation has been issued, said interaction control means including means for monitoring an operating state of at least one of said input means or said output means so as to supply problem information indicating generation of a problem to said media allocation means when the problem inhibiting use of the input media allocation or the output media allocation which have been selected and used occurs, and said media allocation means including means for changing the input-output media allocation when the problem information is supplied to said media allocation means.

9. A multimodal interaction apparatus comprising:

problem solving means for subjecting an input to a calculation process to satisfy an object of the system and outputting a result of process;

an input device, having plural input means, for interpreting an information input from at least one input means selected from said plural input means in accordance with an input-output media allocation and supplying an information corresponding to a result of interpretation to said problem solving means;

an output device, having plural output means, for outputting a result of the process output from said problem solving means from at least one output means selected from the plural output means in accordance with the input-output media allocation;

interaction control means for changing the input-output media allocation in accordance with the result of the process output from said problem solving means and controlling input and output to be performed by said input means and said output means; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of said problem solving means, at least one of a selection of an information from said problem solving means and a combination of the selected information, and said media allocation means performing new media allocation when an instruction to change the input-output media allocation has been issued, said problem solving means including means for supplying an input request to said interaction control means when information required to solve a problem of the system is needed to be acquired from the user so as to urge the user to input a required information, and said media allocation means including means for performing new media allocation by using said required information when an instruction for performing a process for changing the input-output media allocation has been supplied.

10. A multimodal interaction apparatus comprising:

problem solving means for subjecting an input to a calculation process to satisfy an object of the system and outputting a result of process;

an input device, having plural input means, for interpreting an information input from at least one input means selected from said plural input means in accordance with an input-output media allocation and supplying an information corresponding to a result of interpretation to said problem solving means;

an output device, having plural output means, for outputting a result of the process output from said problem solving means from at least one output means selected from the plural output means in accordance with the input-output media allocation;

interaction control means for changing the input-output media allocation in accordance with the result of the process output from said problem solving means and controlling input and output to be performed by said input means and said output means; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of said problem solving means, at least one of a selection of an information from said problem solving means and a combination of the selected information, and said media allocation means performing new media allocation when an instruction to change the input-output media allocation has been issued, said interaction control means including means for supplying an output request for requiring said problem solving means to output information required to constitute an output to the user in accordance with the input-output media allocation in which said output device have been set and requiring said problem solving means to output a required information, and said media allocation means including means for performing new media allocation by using said requested information when an instruction for performing a process for changing the input-output media allocation have been supplied.

11. A multimodal interaction apparatus comprising:

problem solving means for subjecting an input to a calculation process to satisfy an object of the system and outputting a result of process;

an input device, having plural input means, for interpreting an information input from at least one input means selected from said plural input means in accordance with an input-output media allocation and supplying an information corresponding to a result of interpretation to said problem solving means;

an output device, having plural output means, for outputting a result of the process output from said problem solving means from at least one output means selected from the plural output means in accordance with the input-output media allocation;

interaction control means for changing the input-output media allocation in accordance with the result of the process output from said problem solving means and controlling input and output to be performed by said input means and said output means; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of said problem solving means, at least one of a selection of an information from said problem solving means and a combination of the selected information, and said media allocation means performing new media allocation when an instruction to change the input-output media allocation has been issued, said media allocation means including a media allocation slot for recording an input-output media allocation information which are selected at present, and when an instruction to change the input-output media allocation has been issued, a new media allocation is performed by using the input-output media allocation information recorded in said media allocation slot.

12. A multimodal interaction apparatus comprising:

problem solving means for subjecting an input to a calculation process to satisfy an object of the system and outputting a result of process;

an input device, having plural input means, for interpreting an information input from at least one input means selected from said plural input means in accordance with an input-output media allocation and supplying an information corresponding to a result of interpretation to said problem solving means;

an output device, having plural output means, for outputting a result of the process output from said problem solving means from at least one output means selected from the plural output means in accordance with the input-output media allocation;

interaction control means for changing the input-output media allocation in accordance with the result of the process output from said problem solving means and controlling input and output to be performed by said input means and said output means; and media allocation means for performing the input-output media allocation by interacting with the user, said input-output media allocation including (i) at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of said problem solving means, at least one of a selection of an information from said problem solving means and a combination of the selected information, and said media allocation means performing new media allocation when an instruction to change the input-output media allocation has been issued, said media allocation means including a media allocation history slot for storing a series of input-output media allocation information which have been selected, when the input-output media allocation has been changed, selected input-output media allocation information is added to said media allocation history slot, and when an instruction to change the input-output media allocation has been issued, a new media allocation is performed by using the input-output media allocation information recorded in said media allocation slot.

13. A multimodal interaction apparatus in which input correspondence information is generated by interpreting information obtained from a user by interaction and the input correspondence information is, through communication means, supplied to a problem solving device for processing the input correspondence information to satisfy predetermined purposes and outputting a result of process so as to output the result of the process of the input correspondence information by interaction, the apparatus comprising:

an input device for interpreting information input from at least one input means among plural input means which has been selected in accordance with an input-output media allocation and generating a correspondence information in accordance with a result of interpretation;

an output device for outputting said correspondence information obtained from said problem solving means through said communication means from at least one output means among plural output means which has been selected in accordance with the input-output media allocation;

communication means for supplying, to said problem solving means, said input correspondence information generated by said input means and receiving, from said problem solving means, a result of a problem solving operation generated and output by said problem solving means; and media allocation means for performing the input-output media allocation by interacting with the user, said input-output media allocation including
  (i) at least one of a selection of a corresponding information to be supplied from said input means to said problem solving means from corresponding information generated for each of the input media and a combination of the corresponding information generated from said problem solving means for each of the input media, and
  (ii) to obtain an information output from said problem solving means to said output device, at least one of a selection of an information from said problem solving means and a combination of the selected information, said media allocation means including a media allocation slot for recording an input-output media allocation information which are selected at present, and when an instruction to change the input-output media allocation has been issued, a new media allocation is performed by using the input-output media allocation information recorded in said media allocation slot.

14. A multimodal interaction apparatus in which input correspondence information is generated by interpreting information obtained from a user by interaction and the input correspondence information is, through communication means, supplied to a problem solving device for processing the input correspondence information to satisfy predetermined purposes and outputting a result of process so as to output the result of the process of the input correspondence information by interaction, the apparatus comprising:

an input device for interpreting information input from at least one input means among plural input means which has been selected in accordance with an input-output media allocation and generating a correspondence information in accordance with a result of interpretation;

an output device for outputting said correspondence information obtained from said problem solving means through said communication means from at least one output means among plural output means which has been selected in accordance with the input-output media allocation;

communication means for supplying, to said problem solving means, said input correspondence information generated by said input means and receiving, from said problem solving means, a result of a problem solving operation generated and output by said problem solving means; and media allocation means for performing the input-output media allocation by interacting with the user, said input-output media allocation including
  (i) at least one of a selection of a corresponding information to be supplied from said input means to said problem solving means from corresponding information generated for each of the input media and a combination of the corresponding information generated from said problem solving means for each of the input media, and
  (ii) to obtain an information output from said problem solving means to said output device, at least one of a selection of an information from said problem solving means and a combination of the selected information, said media allocation means including a media allocation history slot for storing a series of input-output media allocation information which have been selected, when the input-output media allocation has been changed, selected input-output media allocation information is added to said media allocation history slot, and when an instruction to change the input-output media allocation has been issued, a new media allocation is performed by using the input-output media allocation information recorded in said media allocation slot.

15. A multimodal interaction apparatus in which input correspondence information is generated by interpreting information obtained from a user by interaction and the input correspondence information is supplied to a problem solving device for processing the input correspondence information to satisfy predetermined purposes and outputting a result of process so as to output the result of the process of the input correspondence information by interaction, the apparatus comprising:

an input device for interpreting information input from at least one input means among plural input means which has been selected in accordance with an input-output media allocation and generating a correspondence information in accordance with a result of interpretation;

an output device for outputting said correspondence information obtained from said problem solving means through said communication means from at least one output means among plural output means which has been selected in accordance with the input-output media allocation;

interaction control means for changing the input-output media allocation in accordance with the result of the process performed by said problem solving means and controlling input and output to be performed by said input means and said output means;

communication means for supplying, to said problem solving means, said input correspondence information generated by said input means and receiving, from said problem solving means, a result of a problem solving operation generated and output by said problem solving means; and media allocation means for performing the input-output media allocation by interacting with the user, said input-output media allocation including
  (i) to obtain the correspondence information to be supplied to the problem solving means from the input of said at least one input means, at least one of a selection of a corresponding information to be supplied from said input means to said problem solving means from corresponding information generated for each of the input media and a combination of the corresponding information generated from said problem solving means for each of the input media, and
  (ii) to obtain an expression instructing the user from the output of the problem solving means, at least one of a selection of an information from said problem solving means and a combination of the selected information, said media allocation means including a media allocation slot for recording an input-output media allocation information which are selected at present, and when an instruction to change the input-output media allocation has been issued, a new media allocation is performed by using the input-output media allocation information recorded in said media allocation slot.

16. A multimodal interaction apparatus in which input correspondence information is generated by interpreting information obtained from a user by interaction and the input correspondence information is supplied to a problem solving device for processing the input correspondence information to satisfy predetermined purposes and outputting a result of process so as to output the result of the process of the input correspondence information by interaction, the apparatus comprising:

an input device for interpreting information input from at least one input means among plural input means which has been selected in accordance with an input-output media allocation and generating a correspondence information in accordance with a result of interpretation;

an output device for outputting said correspondence information obtained from said problem solving means through said communication means from at least one output means among plural output means which has been selected in accordance with the input-output media allocation;

interaction control means for changing the input-output media allocation in accordance with the result of the process performed by said problem solving means and controlling input and output to be performed by said input means and said output means;

communication means for supplying, to said problem solving means, said input correspondence information generated by said input means and receiving, from said problem solving means, a result of a problem solving operation generated and output by said problem solving means; and media allocation means for performing the input-output media allocation by interacting with the user, said input-output media allocation including (i) to obtain the correspondence information to be supplied to the problem solving means from the input of said at least one input means, at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of the problem solving means, at least one of a selection of an information from said problem solving means and a combination of the selected information, said media allocation means including a media allocation history slot for storing a series of input-output media allocation information which have been selected, when the input-output media allocation has been changed, selected input-output media allocation information is added to said media allocation history slot, and when an instruction to change the input-output media allocation has been issued, a new media allocation is performed by using the input-output media allocation information recorded in said media allocation slot.

17. A multimodal interaction apparatus in which input correspondence information is generated by interpreting information obtained from a user by interaction and the input correspondence information is supplied to a problem solving device for processing the input correspondence information to satisfy predetermined purposes and outputting a result of process so as to output the result of the process of the input correspondence information by interaction, the apparatus comprising:

an input device for interpreting information input from at least one input means among plural input means which has been selected in accordance with an input-output media allocation and generating a correspondence information in accordance with a result of interpretation;

an output device for outputting said correspondence information obtained from said problem solving means through said communication means from at least one output means among plural output means which has been selected in accordance with the input-output media allocation;

interaction control means for changing the input-output media allocation in accordance with the result of the process performed by said problem solving means and controlling input and output to be performed by said input means and said output means;

communication means for supplying, to said problem solving means, said input correspondence information generated by said input means and receiving, from said problem solving means, a result of a problem solving operation generated and output by said problem solving means; and media allocation means for performing the input-output media allocation by interacting with the user, said input-output media allocation including (i) to obtain the correspondence information to be supplied to the problem solving means from the input of said at least one input means, at least one of a selection of a corresponding information to be supplied from said input means to said problem solving means from corresponding information generated for each of the input media and a combination of the corresponding information generated from said problem solving means for each of the input media, and (ii) to obtain an expression instructing the user from the output of the problem solving means, at least one of a selection of an information from said problem solving means and a combination of the selected information, said interaction control means including at least one of input request means for causing said input means to urge the user to input a required information in response to input request information generated by said problem solving means and supplied to said interaction control means through said communication means when said problem solving means requires an information needed to solve a problem of the system, and output request means for generating an output request for requesting said problem solving means to output information needed to constitute an output to the user in accordance with the input-output media allocation in which said output means has been set and supplying the output request to said problem solving means through said communication means to request said problem solving means to supply said output requirement through said communication means, and said media allocation means including means for performing new media allocation by using at least one of said input request and said output request when an instruction to change the input-output media allocation has been issued.

\* \* \* \* \*